(12) United States Patent
Gooren et al.

(10) Patent No.: US 6,726,556 B2
(45) Date of Patent: Apr. 27, 2004

(54) METHOD AND DEVICE FOR SEPARATING ABDOMINAL FAT FROM ABDOMINAL SKIN OF POULTRY

(75) Inventors: Peter Antonius Maria Gooren, Broekhuizenvorst (NL); Francis Willem Johan van Happen, St. Hubert (NL); Jenneke Antonia Christina Lankhaar, Bokhoven (NL); Adrianus Josephes van den Nieuwelaar, Gemert (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 10/192,681

(22) Filed: Jul. 9, 2002

(65) Prior Publication Data

US 2002/0173261 A1 Nov. 21, 2002

Related U.S. Application Data

(63) Continuation of application No. PCT/NL01/00012, filed on Jan. 10, 2001.

(30) Foreign Application Priority Data

Jan. 17, 2000 (NL) .............................. 1014094
Apr. 20, 2000 (NL) .............................. 1014994

(51) Int. Cl.⁷ .............................. A22C 21/00
(52) U.S. Cl. .............................. 452/116; 452/117
(58) Field of Search .............................. 452/116, 117, 452/118, 106, 109, 122

(56) References Cited

U.S. PATENT DOCUMENTS

| 4,023,237 A | * | 5/1977 | Meyn ........................ 452/122 |
| 4,899,421 A | * | 2/1990 | Van Der Eerden .......... 452/116 |
| 5,135,431 A | * | 8/1992 | van den Nieuwelaar et al. ........ 452/116 |

FOREIGN PATENT DOCUMENTS

| EP | 0 258 499 A1 | 3/1988 |
| EP | 0 400 696 A1 | 12/1990 |
| EP | 0 486 099 A1 | 5/1992 |
| EP | 0 497 014 A1 | 8/1992 |
| EP | 0 539 134 A1 | 4/1993 |
| WO | WO 01/52658 A1 | 7/2001 |

OTHER PUBLICATIONS

Novelty Search Report in priority Application No. NL 1014994 (with English translation).

International Search Report in related Application No. PCT/NL01/00012.

* cited by examiner

Primary Examiner—Charles T. Jordan
Assistant Examiner—Judith A. Nelson
(74) Attorney, Agent, or Firm—Kilpatrick Stockton LLP

(57) ABSTRACT

In a method for separating abdominal fat from abdominal skin of a slaughtered bird, a supporting surface is positioned against at least a part of that side of the abdominal skin which is remote from the abdominal fat. At least a section of the abdominal fat is scraped off the abdominal skin with the aid of a movable scraper member. The movement of the scraper member is directed substantially parallel to the supporting surface. The supporting surface forms part of a flat plate. The scraper member comprises a bracket, a claw or a body provided with a scraping edge.

45 Claims, 21 Drawing Sheets

METHOD AND DEVICE FOR SEPARATING ABDOMINAL FAT FROM ABDOMINAL SKIN OF POULTRY

CROSS-REFERENCE TO RELATED APPLICATION

This is a continuation application of PCT/NL01/00012 filed Jan. 10, 2001, which PCT application claims priority of Dutch patent application number 1014094 filed Jan. 17, 2000 and of Dutch patent application number 1014994 filed Apr. 20, 2000, both herein incorporated by reference.

FIELD OF THE INVENTION

The invention relates to a method for separating abdominal fat from abdominal skin of a slaughtered bird, comprising: positioning a supporting surface against at least a part of the side of the abdominal skin which is remote from the abdominal fat, and scraping at least a part of the abdominal fat off the abdominal skin with the aid of a movable scraper member. The invention also relates to a device for carrying out the method.

BACKGROUND OF THE INVENTION

A bird has abdominal fat in the abdominal cavity against the abdominal skin in the region between the cloaca and the sternum. When the bird is slaughtered, without special measures the abdominal fat remains attached to freely hanging parts of the abdominal skin of the carcass after the viscera have been removed therefrom via an abdominal opening.

Nowadays, traders in slaughtered poultry products impose different demands on the removal of abdominal fat from abdominal skin of poultry depending on specific consumer requests. In some cases, it is required for all the abdominal fat to be removed from the carcass (and for the abdominal skin to remain on the carcass), but in other cases there is also a demand for the possibility of selective removal of abdominal fat, meaning that the amount of abdominal fat to be removed must be adjustable from 0% to 100% (with the abdominal skin remaining on the carcass). In addition, there is a demand for an increase in the quality of the abdominal fat obtained by avoiding the abdominal fat of a bird being recovered in many pieces and/or by avoiding contamination to the abdominal fat obtained by moisture and other tissue, such as pieces of intestine or kidneys. If it forms a substantially cohesive unit and is free from contamination, the abdominal fat can be processed further as a high-grade product and can be redistributed to slaughtered poultry products, for example as natural product fat. Furthermore, there is a demand for it to be possible to remove the abdominal fat either before cooling of the carcass or after this cooling, as desired. In this context, the fact that the mechanical properties of the carcass, and in particular of the abdominal skin and of the abdominal fat, differ considerably before and after cooling has to be taken into account.

DISCUSSION OF THE PRIOR ART

The separation of abdominal fat from abdominal skin is known from the prior art.

European Patent Application 486,099 discloses a device and method in which an oval, conical head with a scraping edge is passed through an abdominal opening into the body cavity of a slaughtered bird which is hanging by its legs from a hook. Behind the head there is an elongate, axially movable, hollow mandrel with transverse dimensions which are smaller than those of the head. Furthermore, behind the head there is an annular supporting member which can move in the same direction as the mandrel and the transverse dimensions of which substantially correspond to those of the head. The supporting member can be pressed onto the rear side of the head by means of spring means. As a result of a subatmospheric pressure being created in the mandrel, abdominal skin is sucked along the head into the mandrel. Then, the supporting member is moved towards the head, so that the abdominal skin is clamped between the head and the supporting member. Then, the head is moved out of and, together with the supporting member, away from the carcass, the abdominal fat being scraped off the abdominal skin at the location of the scraping edge of the head. The abdominal fat which is scraped off is sucked away via the mandrel.

One drawback of the known device is that the head is bulky, and consequently there is a risk of abdominal skin being torn into and torn off as a result of displacement. Therefore, detached pieces of abdominal skin may pass into the abdominal fat removed, which is highly undesirable since such pieces impair the quality of the abdominal fat or subsequently have to be removed again from the abdominal fat obtained in order to achieve a high quality. Secondly, the presence of abdominal skin in abdominal fat reduces the weight of (the carcass of) the bird, so that the yield from the bird is lower.

The use of vacuum to suck away abdominal fat has the drawback that the abdominal fat is removed in pieces and that all kinds of undesirable substances and pieces of tissue (such as pieces of intestines and kidneys) which are situated in the airstream sucked away may find their way into the abdominal fat removed, with the consequences discussed above.

In the known device, there is also a risk of abdominal skin being torn into and torn off on account of the fact that the movement of the scraper member, i.e. the scraping edge of the head, is directed substantially perpendicularly to the supporting surface which interacts therewith, i.e. the bottom side of the annular supporting member. As a result, the scraping edge may tear the abdominal skin in the event of a heavy load being imposed on the abdominal skin as a result of the scraping. In the embodiment selected, the load on the abdominal skin is high on account of the fact that both the scraper member and the supporting surface are moving in the same direction relative to the abdominal skin.

Another drawback of the bulky nature of the known device is that consequently the freedom of design decreases with respect to the design of the bird-conveyor hook, which must not interfere with one another.

Yet another drawback of this known device is that it is unsuitable for use on carcasses which have been cooled, since the abdominal skin, which is relatively rigid on account of the cooling, cannot be sucked into the mandrel.

SUMMARY OF THE INVENTION

It is an object of the invention to provide a method and device which provide a low load on the abdominal skin and high efficiency of removal of abdominal fat and which can be used on both uncooled and cooled carcasses.

Another object of the invention is to provide a device which is of simple design and not very bulky.

A further object of the invention is to provide a device which allows selective, i.e. optionally complete or partial, removal of abdominal fat.

Yet another object of the invention is to provide a method and device with which abdominal fat can be obtained as a high-grade product, i.e. substantially as a whole and/or substantially without contamination.

To achieve one or more of the abovementioned and other objects, the method according to the invention is wherein the movement of the scraper member is directed substantially parallel to the supporting surface. First displacement means are provided for implementing this feature in the device according to the invention. By virtue of this feature, the load on the abdominal skin is relatively low, thus preventing undesirable tearing of the abdominal skin both in the case in which the supporting surface adopts a substantially fixed position with respect to the abdominal skin during the scraping operation and in the case in which the supporting surface moves with respect to the abdominal skin, in the same direction as the scraper member or in the opposite direction, during the scraping operation.

Preferably, the supporting surface is moved to the vicinity of the edge of an evisceration opening of the bird immediately prior to the scraping operation, and in particular the supporting surface is positioned on the side of the sternum of the bird. The abdominal skin can then be brought into contact with the supporting surface over its maximum surface area, so that the removal of abdominal fat can be carried out optimally. To achieve a selective harvesting of abdominal fat, it is obviously also possible for the supporting surface to be moved at least partially into the abdominal cavity of the bird immediately prior to the scraping operation, if only a part of the abdominal fat is to be obtained. In this case, the supporting surface will shield part of the abdominal skin, making it inaccessible to the scraper member. Another possibility for harvesting only a part of the abdominal fat which is present is for the supporting surface to be moved no further than to a distance from the edge of and outside the abdominal cavity of the bird. In this way, it will not be possible for the scraper member to scrape off the abdominal fat which is situated on a part of the abdominal skin which extends between the abdominal cavity and the supporting surface. Yet another possibility for obtaining part of the abdominal fat which is present is for the scraper member not to be allowed to execute a complete movement along the supporting surface. Yet another possibility for obtaining part of the abdominal fat which is present is to select a predetermined distance at which the scraper member moves along the supporting surface.

It will be clear that the possibilities discussed above for obtaining a selectivity in terms of the extent of abdominal fat recovery may be used both separately and in various combinations with one another, both for each processed bird and for each series of processed birds, by means of suitable data-based control of the device according to the invention. Moreover, the selective removal of abdominal fat can be carried out not only in the method and device according to the invention but also in other methods and devices for removing abdominal fat, such as those according to the prior art.

To allow the abdominal skin to be taken optimally against the supporting surface, the scraper member is preferably moved at least partially into the abdominal cavity of the bird prior to the scraping operation.

Expediently, an active section of the scraper member, while it is being introduced into the abdominal cavity of the bird, is situated, as seen in a direction perpendicular to the supporting surface, at a first distance from the supporting surface, and during at least part of the scraping operation is situated at a second distance from the supporting surface, the second distance being shorter than the first distance. Therefore, prior to the scraping operation, the active section moves towards the supporting surface, which movement can take place from various starting positions and along various paths.

In a preferred embodiment of the method according to the invention, the abdominal side of the bird faces upwards during the scraping operation.

In a further preferred embodiment of the method according to the invention, the abdominal fat is taken, mechanically and under atmospheric conditions, between the supporting surface and the scraper member prior to the scraping operation. Consequently, the use of vacuum with the associated risks is avoided. Incidentally, the use of this measure is not limited to the method and device according to the invention.

In a preferred embodiment of the method according to the invention, the abdominal fat situated between the supporting surface and the scraper member is gripped securely by a gripper member during the scraping movement, or at least a part thereof. Gripping the abdominal fat during the scraping movement allows the abdominal fat to be removed in a very controllable way and a gentle pulling action also emanates from the scraping movement, thus promoting the ultimate scraping action. The gripper member may, for example, be pivotably connected to the scraper member.

In another preferred embodiment of the method according to the invention, the abdominal fat is completely or partially cut free from the abdominal skin during the scraping movement or at least a part thereof.

In a preferred embodiment of the device according to the invention, the supporting surface comprises one or more substantially flat faces. In this way, it is possible to obtain a simple form of the device, in particular if the supporting surface is formed by one or more plates which optionally adjoin one another and are connected to one another.

The scraper member preferably comprises a bracket, in particular—with a view to mechanical strength and limited use of material—a continuous bracket which delimits an opening. If the bracket is formed in such a manner that its transverse dimension decreases towards the front end (i.e. the end which is intended to be the first to reach a bird when carrying out an operation of removing abdominal fat) of the bracket, the forces acting on the bracket are distributed during the operation of removing abdominal fat. This measure also allows easy entry for the scraper member.

In an alternative embodiment, the bracket comprises at least two bracket parts which are displaceable with respect to one another and are preferably pivotable with respect to one another. This measure allows the size of the scraper member to be reduced considerably in particular while it is being introduced into the bird, thus reducing the risk of undesirable damage to the bird and/or the skin.

In an alternative embodiment of the device according to the invention, the scraper member comprises a gripper member which is pivotably connected thereto and with which part of the abdominal fat which is to be removed is gripped during the scraping operation, leading to an improved scraping action.

These and other aspects, features and advantages of the present invention will be more readily appreciated as the same becomes better understood by reference to the following detailed description and considered in connection with the accompanying drawings, in which identical reference numerals denote identical or similar components.

DESCRIPTION OF THE PREFERRED EMBODIMENTS

Figure 1:
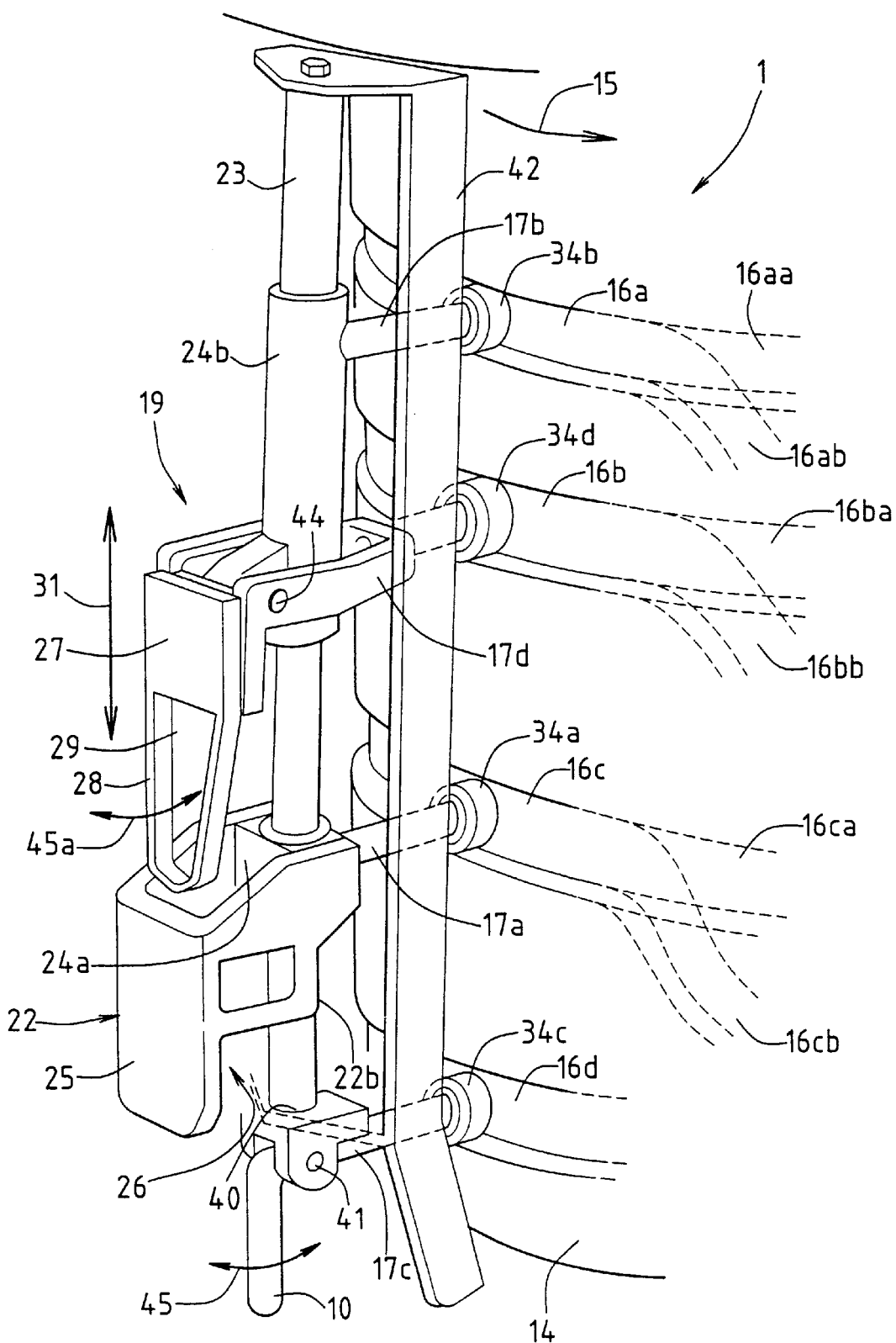
FIG. 1 diagrammatically depicts a perspective view of a device according to the invention.

FIG. 1 shows a device 1 for separating abdominal fat from abdominal skin of a slaughtered bird. A slaughtered bird, or at least the carcass thereof in the context of the present invention, usually hangs by its legs, in the region of the ankle joints, from a product carrier. The product carrier forms part of a collection of product carriers which are connected to one another by a driven chain and are moved by means of a conveyor. The product carrier may be designed in such a manner that the legs are enclosed by a bracket, having a first bracket part and a second bracket part, which are pivotable with respect to one another and, in a closed position, enclose the legs substantially in the form of a ring. However, the product carrier may also be designed, for example, as a double hook without moving parts, for example as a metal bracket in which receiving slots for receiving the legs of poultry are arranged.

The device 1 comprises at least one scraping device 19 which is designed to remove abdominal fat from the abdominal cavity of a slaughtered bird from the abdominal skin thereof. The device 1 will usually comprise a number of scraping devices 19 in a carousel arrangement. A linear arrangement is also possible.

In the preferred embodiment of the device 1 according to the invention shown in FIG. 1, the scraping device 19 acts substantially in the vertical direction, but the scraping device may also act at a suitable angle of, for example, 10–45° with respect to the vertical. One of the determining factors in this choice is the design of the product carrier, which determines the space which is available for maneuvering one or more tools between the legs of a bird hanging from the product carrier.

As shown in FIG. 1, the scraping device 19 has a positionable, flat support 22, with an upper side 25 and a supporting surface 26, which support 22 is guidably coupled to a rod-shaped guide 23 via a sleeve 24a. An arm 17a, which at its free end comprises a follower roller 34 which interacts with a cam track 16c of a drum 14, is arranged on the sleeve 24a. The support 22 can thus be positioned in the longitudinal direction of the guide 23, as indicated by a double arrow 31. It should be noted that suitable bearings (not shown in more detail) are provided for the lateral support of the arm 17a and other similar arms which are to be discussed in more detail below.

Above and opposite the supporting surface 26 of the support 22 there is a positionable and pivotable scraper member 27 which is guidably coupled to the rod-shaped guide 23 via a sleeve 24b. The sleeve 24b comprises a first arm 17b with, at a free end thereof, a follower roller 34b which interacts with a cam track 16a of the drum 14, and a second, forked arm 17d with a pivot 44 to which the scraper member 27 is coupled, and with a free end which is provided with a follower roller 34d which interacts with the cam track 16b of the drum 14. The scraper member 27 is substantially formed by a bar- or strip-like material which, in the embodiment shown, forms a bracket which tapers towards its front end, on which a scraping edge 28 is arranged, the bar- or strip-like material defining an opening 29.

In a similar way to the flat support 22, the scraper member 27 is displaceable in the longitudinal direction of the guide 23 and, in addition, is tiltable with respect to the sleeve 24b.

At a first end 40 of the rod-like guide 23 there is a pin 10 which can pivot in the directions of double arrow 45 about a pivot 41 and has an arm 17c with a free end which is provided with a follower roller 34c which interacts with a cam track 16d of the drum 14.

The scraping device 19 is connected, via a frame 42, to a carrier which is not shown for the sake of simplicity of the drawing.

The drum 14 has a plurality of cam tracks 16a, 16b, 16c, 16d which each have a path which changes along the circumference of the drum 14. If the scraping device 19 is conveyed along the drum 14 in the direction indicated by arrow 15, the various follower rollers 34a–34d will interact with the respective cam tracks 16a–16d. The follower rollers 34b and 34a in the respective cam tracks 16a and 16c follow the relevant path of the cam tracks and will pass on the changes in the path via the respective arms 17b, 17a to the scraper member 27 and the support 22, causing them to be displaced along the guide 23 in one of the directions indicated by the double arrow 31. If there is a change in the path of the cam tracks 16d and 16b, the follower rollers 34c and 34d, respectively, of the respective arms 17c, 17d will cause the pin 10 and the scraper member 27, respectively, to pivot in one of the directions indicated by the double arrow 45 and arrow 45a, respectively.

The way in which the scraping device 19 for removing abdominal fat from abdominal skin operates is discussed in more detail and illustrated with the aid of the following Figures, in which some design elements have been omitted for the sake of clarity.

Figure 2:
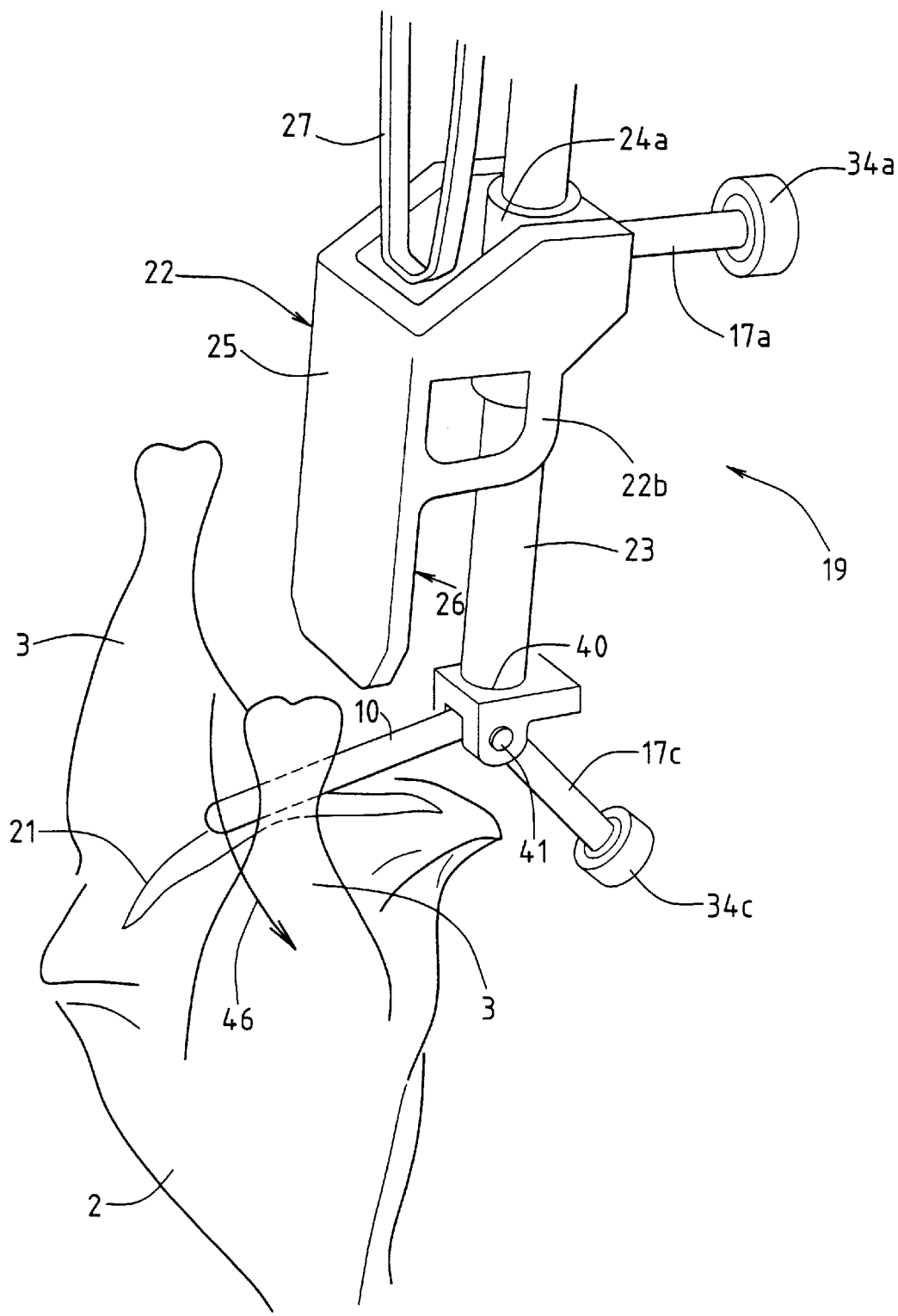
FIG. 2 diagrammatically depicts a perspective view of a detail of the device shown in FIG. 1, in a starting position of use thereof.

FIG. 2 shows the scraper device 19 in a starting position thereof, together with a slaughtered bird 2 which is hanging by its legs 3 in a manner not shown in more detail and has an evisceration opening facing towards the scraper device 19. From the starting position illustrated in the Figure, the pin 10 can be rotated in a direction indicated by arrow 46, the movement of the pin 10 being brought about by the interaction between the follower roller 34c on the arm 17c and the cam track 16d of the drum 14, which was discussed with reference to FIG. 1.

Figure 3:
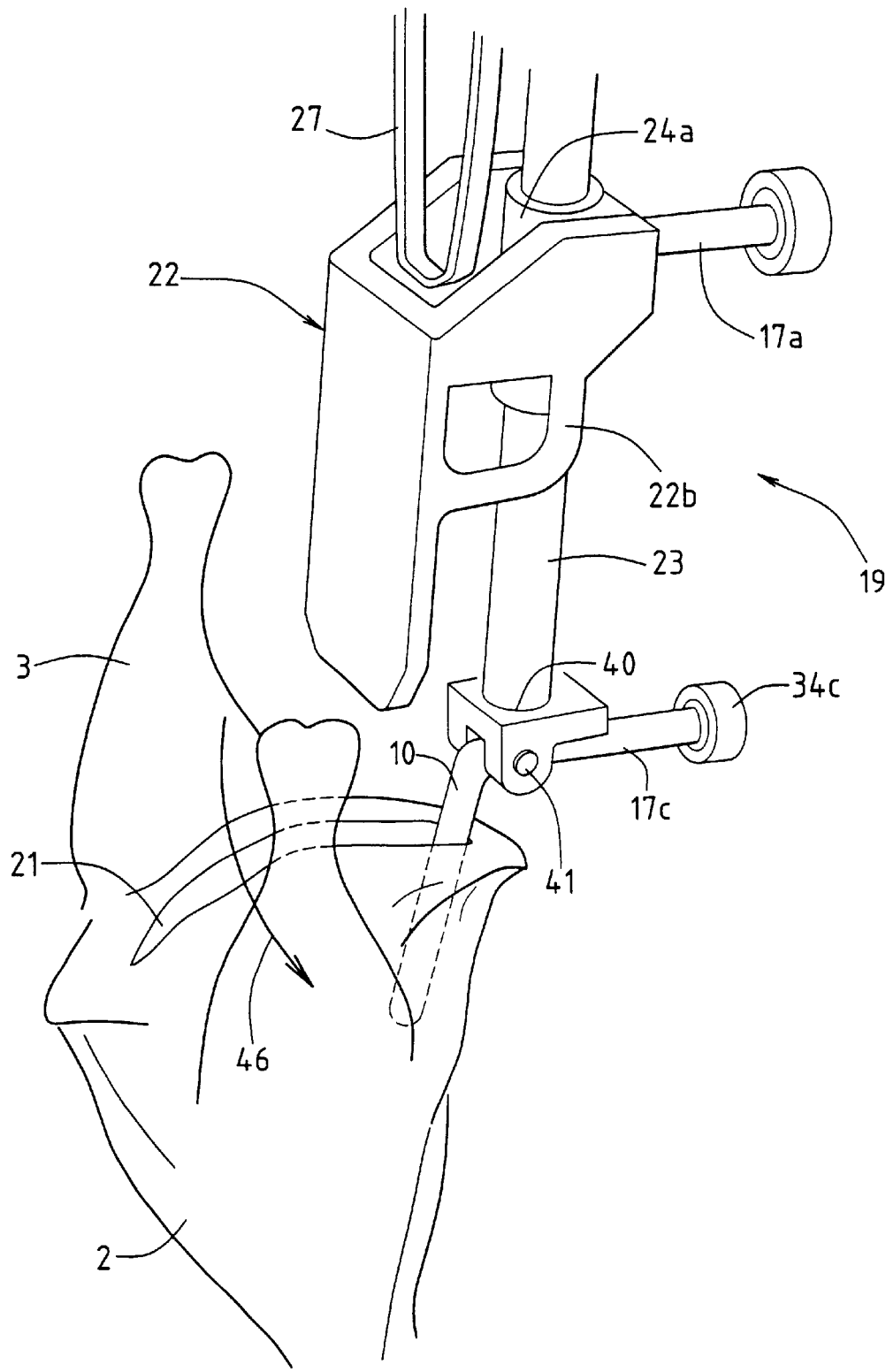
FIG. 3 diagrammatically depicts a perspective view of a detail of the device shown in FIG. 1, in a second position thereof.

FIG. 3 shows the pin 10 in a rotated position, in which a part of the pin 10 has been introduced into the abdominal cavity of the slaughtered bird 2 via the evisceration opening 21. As a result of at least a part of the pin 10 being introduced into at least a part of the abdominal cavity of the slaughtered bird 2, the slaughtered bird 2 is positioned and fixed, optionally in combination with a support element, such as a support plate, which can be placed against, for example, the back. Incidentally, positioning and fixing of this nature can also be brought about for example with the aid of support elements which act on the outside of the bird 2, such as support brackets in the vicinity of the hip joint. It should be noted that the pin 10 can be used not only for the purpose described above, but also for positioning birds for other operations to be carried out thereon.

Figure 4:
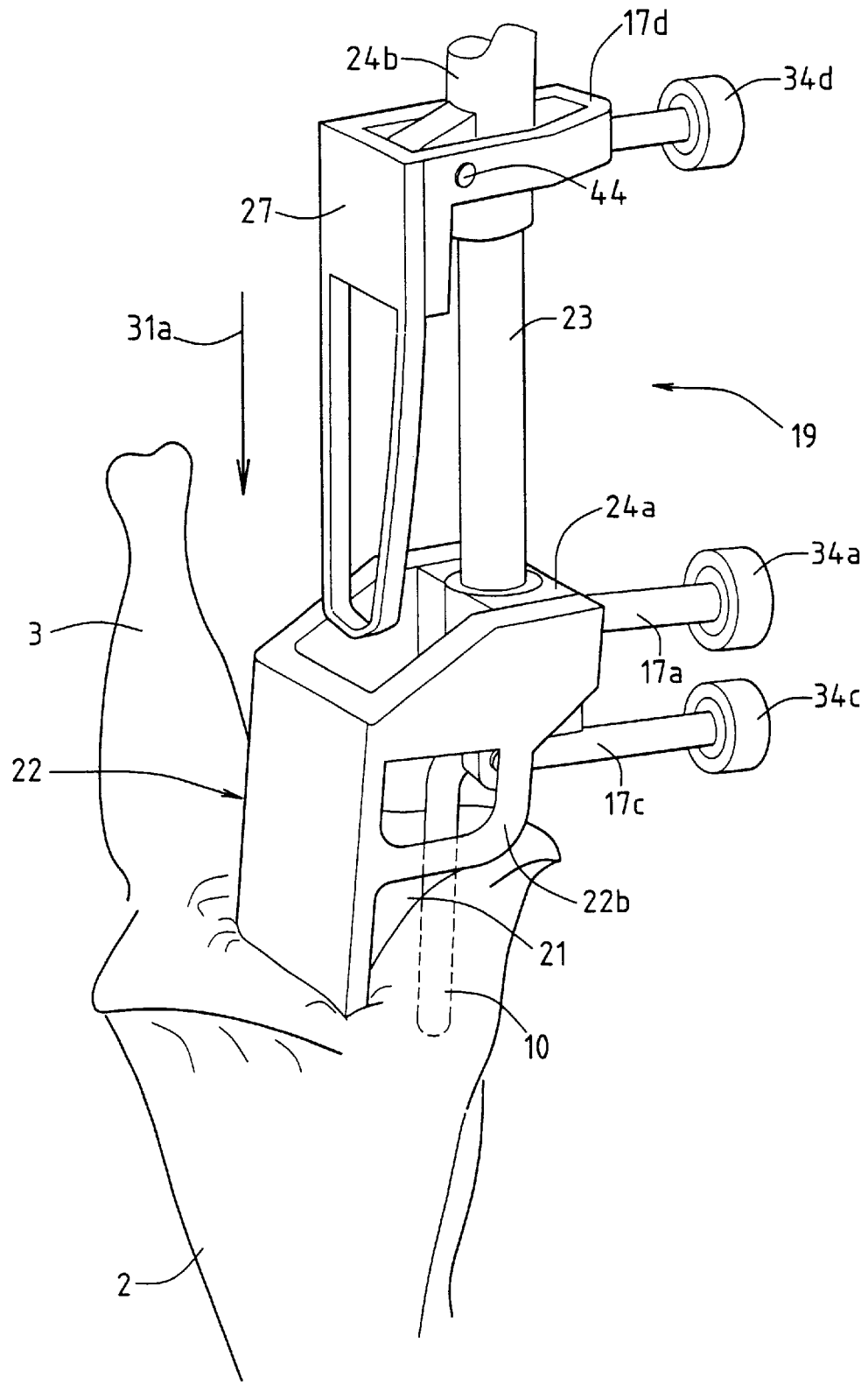
FIG. 4 diagrammatically depicts a perspective view of a detail of the device shown in FIG. 1, in a third position thereof.

As shown in FIG. 4 (in which the right-hand leg 3 of the bird 2 is not shown, for the sake of clarity), the support 22 is then moved onto the (edge of the) evisceration opening 21 of the bird 2 in the vicinity of the tip of the breast, by displacing the support 22 in the direction of arrow 31a, the movement of the support 22 being brought about by the abovementioned interaction between the follower roller 34a of the arm 17a and the cam track 16c of the drum 14.

Then, the scraper member 27 is moved into the abdominal cavity of the bird 2, in the direction of the arrow 31a, via the evisceration opening 21, by interaction between the follower rollers 34b, 34d and the associated cam tracks 16a and 16b, respectively. In the process, the front end of the scraper member 27 moves into the evisceration opening 21 at its tail side, at a short distance from or in contact with the pin 10. During the movement of the scraper member 27, the active section thereof moves inside the bird 2 along the abdominal skin, at a certain distance therefrom, past the edges of the evisceration opening 21, and thus exerts a scraping action which separates abdominal fat from abdominal skin. To stabilize the scraper member 27 during its above movement, the front end of the scraper member 27 may be provided with guide projections (not shown in more detail) which on either side of the pin 10 are supported against this pin.

To make it possible for removal of the abdominal fat to be carried out optionally or only partially on a bird 2 which has been placed in the device 1, the cam tracks 16a and 16b may be provided with at least one controllable points mechanism (not shown in more detail), by means of which the follower rollers 34b and 34d can optionally (cf. FIG. 1) be guided into a branch 16aa or 16ba or into a branch 16ab or 16bb of the cam tracks 16a and 16b, respectively, in order for the removal of abdominal fat to be carried out, not carried out or partially carried out (by varying the scraping travel of the scraper member 27 or its position with respect to the supporting surface 26 of the support 22). In a similar way, for selective removal of abdominal fat (removal, non-removal, partial removal), the cam track 16c may be provided with at least one controllable points mechanism (not shown in more detail), by means of which the follower roller 34a can optionally (cf. FIG. 1) be guided into a branch 16ca or into a branch 16cb of the cam track 16c, in order to vary the location of the support 22 with respect to the bird 2. Furthermore, selective recovery of abdominal fat in the sense of carrying out or not carrying out the recovery of abdominal fat can be obtained by the bird 2 optionally being moved into the working region of the device 1 and/or the scraping device 19, for example by optionally rotating a product carrier, which can rotate eccentrically about a vertical axis and from which the bird 2 is hanging, about the vertical axis.

The points mechanisms can be controlled for each bird to be processed, in order to select a branch on the basis of data, for example data about the bird in question or about the group of birds to which the bird in question belongs, which data are optionally collected upstream in the processing line in which the scraping device is incorporated.

Figure 5:
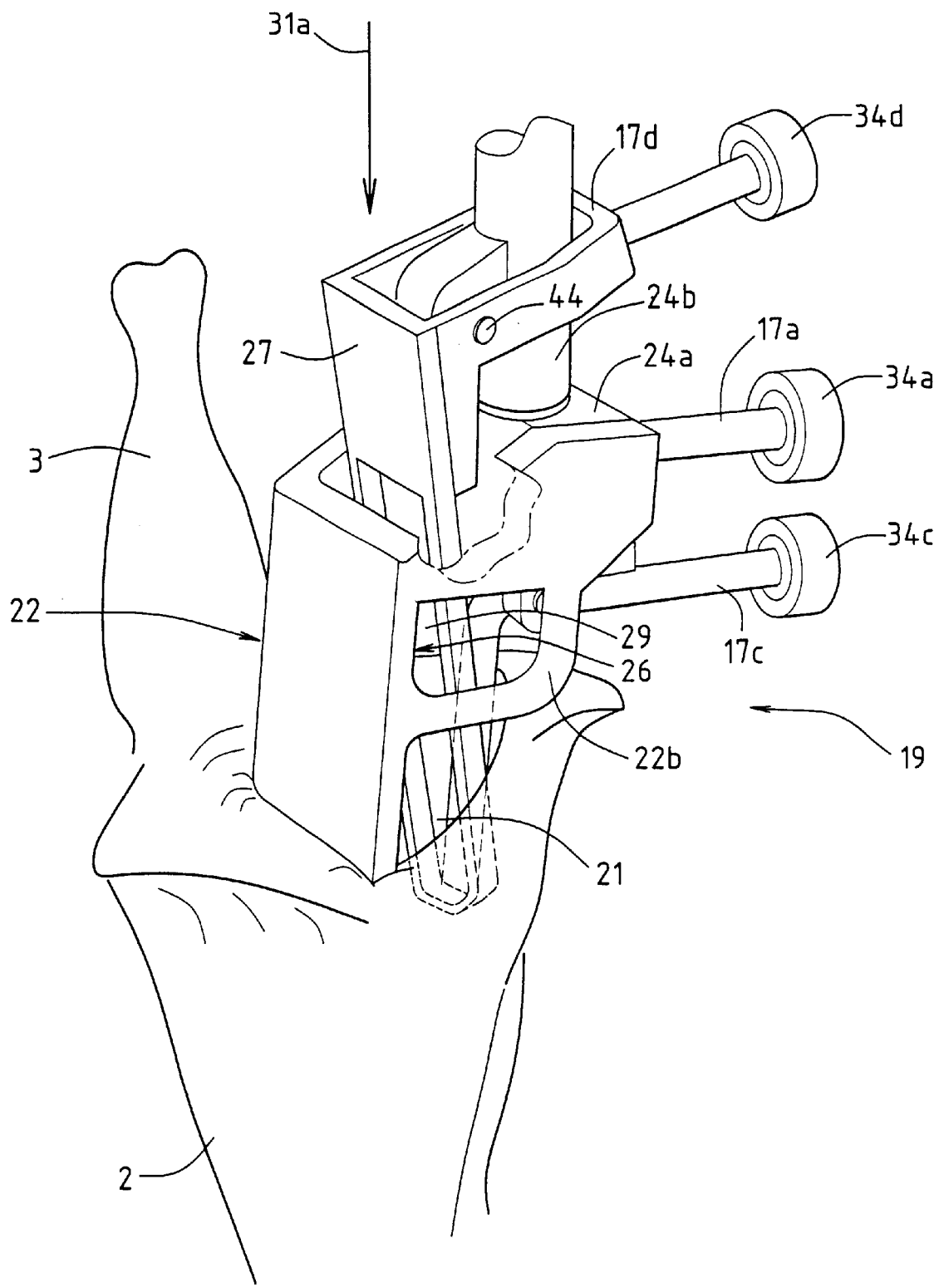
FIG. 5 diagrammatically depicts a perspective view of a detail of the device shown in FIG. 1, in a fourth position thereof.
Figure 6:
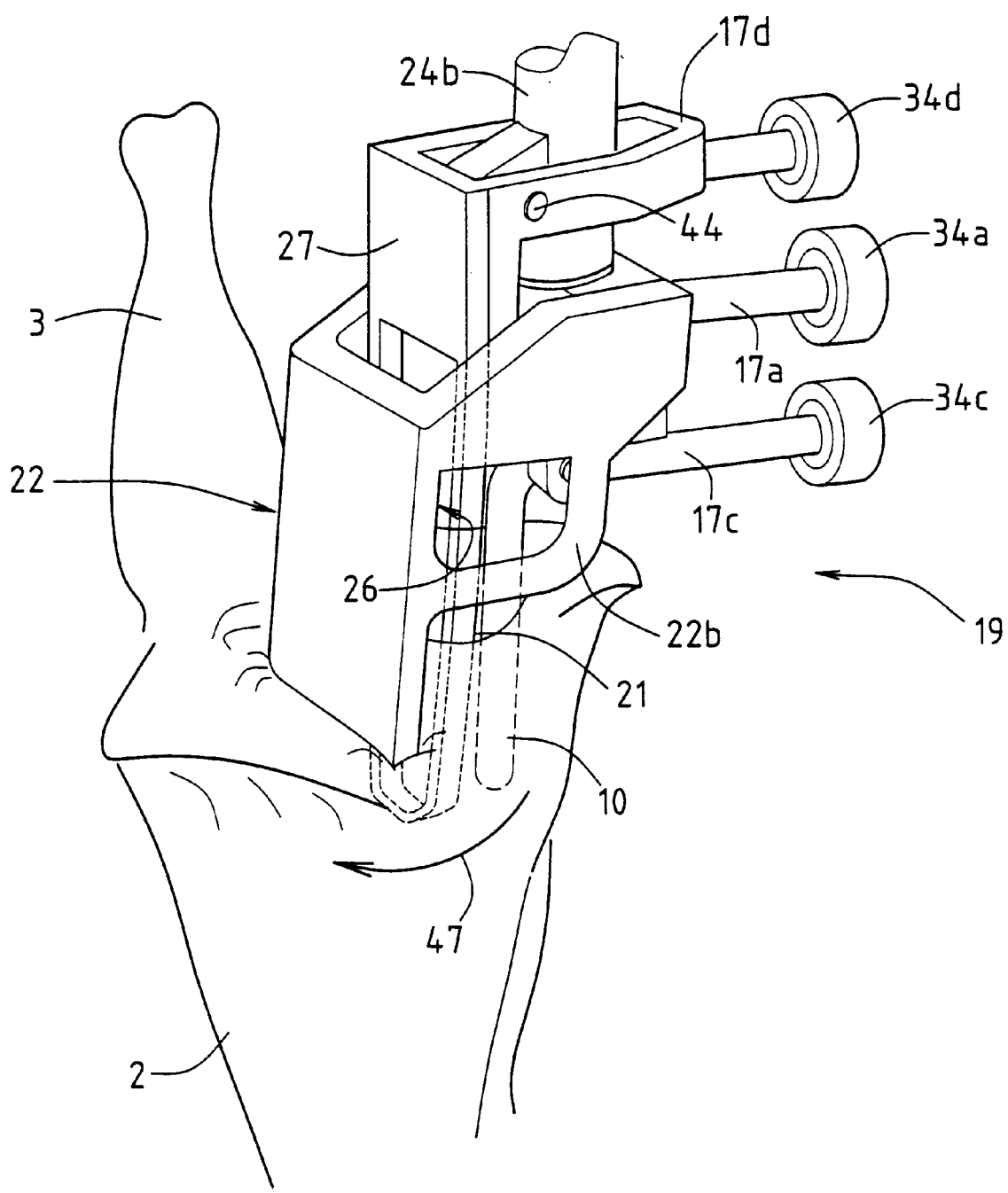
FIG. 6 diagrammatically depicts a perspective view of a detail of the device shown in FIG. 1, in a fifth position thereof.

FIG. 5 (in which, as in FIG. 4, the right-hand leg 3 of the bird 2 is not shown) illustrates the scraping device 19 in a subsequent position, in which the pin 10 and the scraper member 27, at least partially, have been moved into the abdominal cavity of the slaughtered bird 2. In the process, the scraper member 27 adopts an inclined position with respect to the support 22, so that there is a space between the active section of the support 22 and the scraper member 27. If the scraper member 27 is rotated in the direction of the support 22, as indicated by arrow 47 in FIG. 6, by the interaction between the follower roller 34d and the associated cam track 16b with a substantially unchanged position of the support 22, a part of the abdominal skin hanging in the abdominal cavity moves into a position between the scraper member 27 and the supporting surface 26 of the support 22 and into and through the opening 29. In particular, the situation is reached in which the abdominal skin provided with abdominal fat hangs through the opening 29. The scraper member 27 is at a predetermined distance from the supporting surface 26 of the support 22. The pin 10 prevents the forces exerted on the bird 2 during the rotation of the scraper member 27 leading to the bird being displaced with respect to the support 22, in particular in a substantially horizontal direction. The pin 10 also ensures that the bird 2 is positioned in such a manner that the support 22 is situated in the vicinity of the breast tip of the bird 2; in particular, the distance between the supporting surface 26 and the breast tip is a few cm, more particularly approx. 2 cm. During the rotation of the scraper member 27, the latter is already executing a scraping action on the abdominal skin along which the scraping edge 28 of the scraper member 27 moves, for the purpose of separating abdominal fat from abdominal skin.

The scraping action of the scraper member which is obtained during the movement in the bird 2 and rotation towards the support 22 is reinforced by providing the support 22 with bracket parts 22b, of which the downwardly facing side presses the edges of the evisceration opening 21 towards one another, and therefore presses them onto the scraper member 27, in particular the bracket-like part thereof.

The distance between the active, bracket-like section of the scraper member 27 and the supporting surface 26 is selected in accordance with the desired extent of removal of abdominal fat. This distance will be substantially equal to the mean thickness of the abdominal skin if as much abdominal fat as possible is to be removed from the abdominal skin, and will be greater if only partial removal of abdominal fat is desired. In a particular embodiment which is not shown in more detail, the bracket-like section of the scraper member 27 may be arranged resiliently with respect to the remaining section of the scraper member 27, with the result that the bracket-like section of the scraper member 27, at a specific position of the follower roller 34d in the associated cam track 16b, can act with a predetermined stress on the abdominal skin lying against the supporting surface 26.

Figure 7:
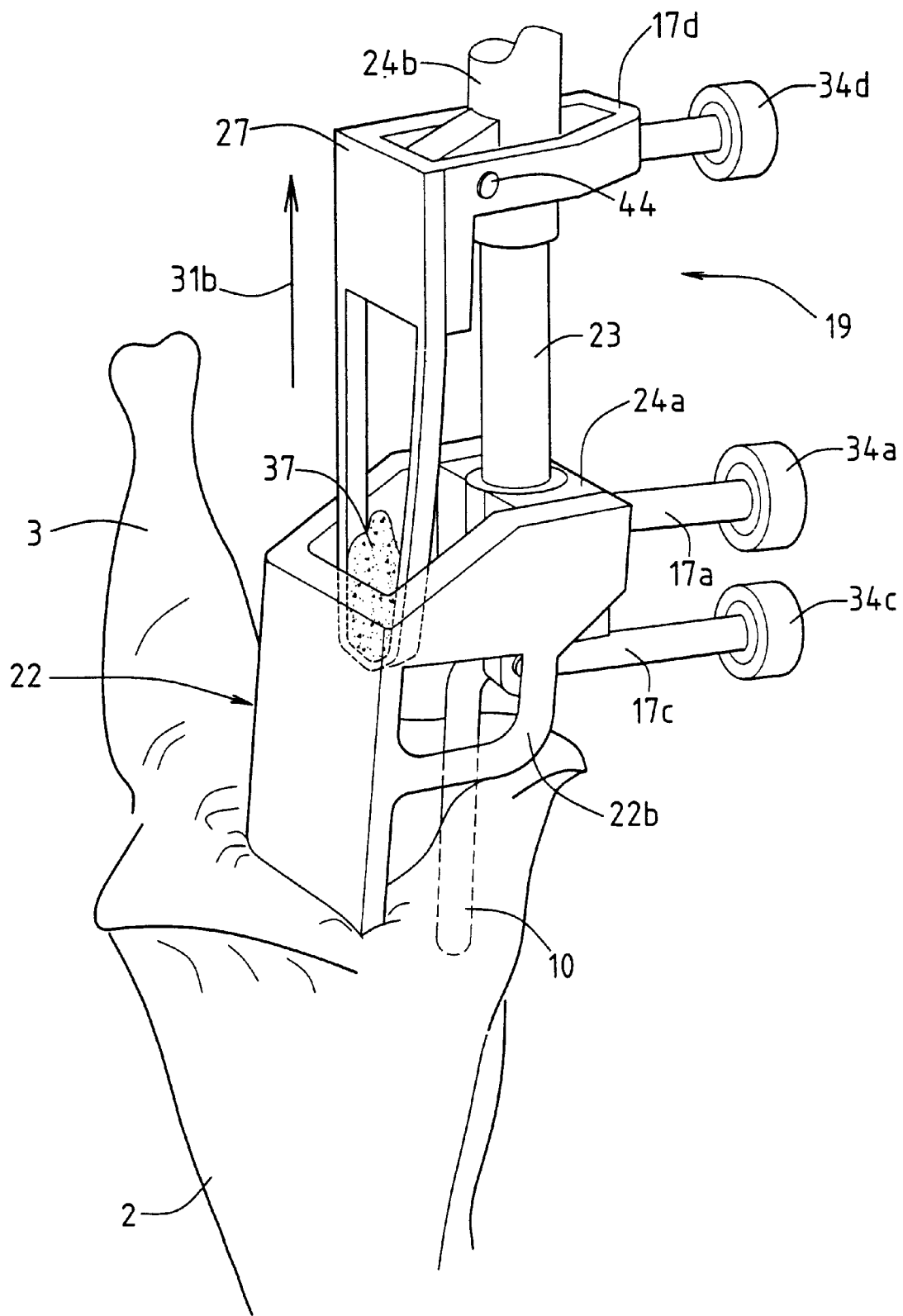
FIG. 7 diagrammatically depicts a perspective view of a detail of the device shown in FIG. 1, in a sixth position thereof.

As shown in FIG. 7, the scraper member 27 is then moved out of the abdominal cavity of the slaughtered bird 2 in the direction of arrow 31b, along the supporting surface 26, which is stationary with respect to the bird 2, in order to remove part or all of the abdominal fat 37 from the abdominal skin. Alternatively, it is also possible for the support 22 or, for example, a support element in the form of a roller, during the movement of the scraper member 27 or another suitable scraper member, to be moved in the direction of the arrow 31b. During the movement of the scraper member 27 out of the abdominal cavity of the slaughtered bird 2, the scraper member 27 moves along the abdominal skin, with abdominal fat being scraped and/or pulled off the abdominal skin.

Figure 8:
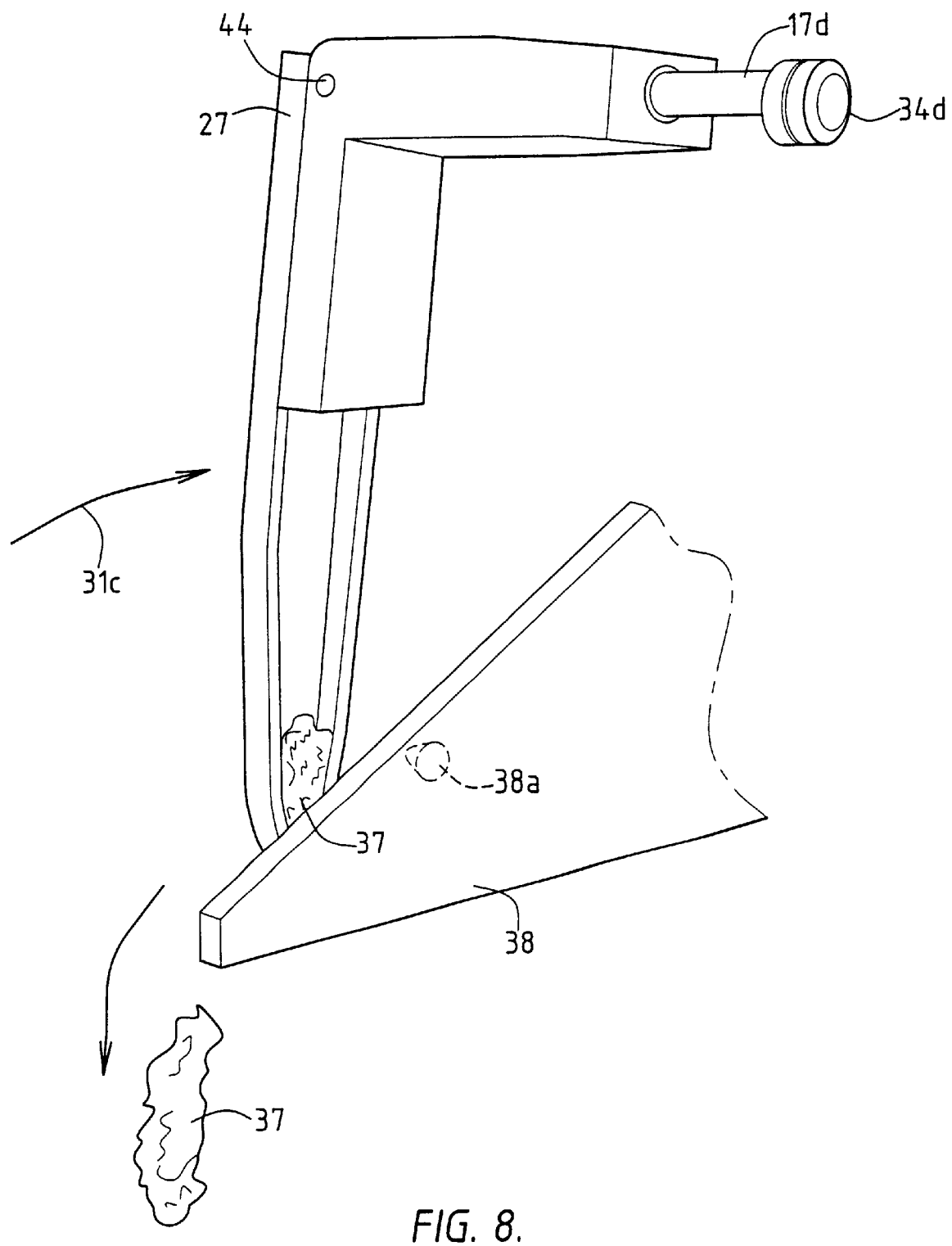
FIG. 8 diagrammatically illustrates a perspective view of the removal of abdominal fat from the device shown in FIG. 1.

As illustrated in FIG. 8, the abdominal fat 37 which has been removed from the bird 2, is substantially uncontaminated and sticks to the support 22 and/or the scraper member 27 can be removed therefrom substantially as a single unit with the aid of a discharge member 38, past which the scraping device 19 is moved in the direction of arrow 31c. The discharge member 38 may be made from a flexible, resilient material, such as a metal or a plastic, and may be provided, on the side facing towards the scraper member 27, with one or more projections 38a which, when the scraper member 27 moves past the discharge member 38, project into the opening 29 in order to push the abdominal fat out of this opening. The discharge member 38 may be arranged both on the side of the scraper member which is shown and on the opposite side. The abdominal fat 37 can also be removed by means of brushing or with the aid of a suction nozzle arranged at a suitable location. After the abdominal fat has been removed, the components of the scraper device 19 can be returned to the starting position which is shown in FIGS. 1 and 2 for the removal of abdominal fat from a subsequent bird.

Figure 9:
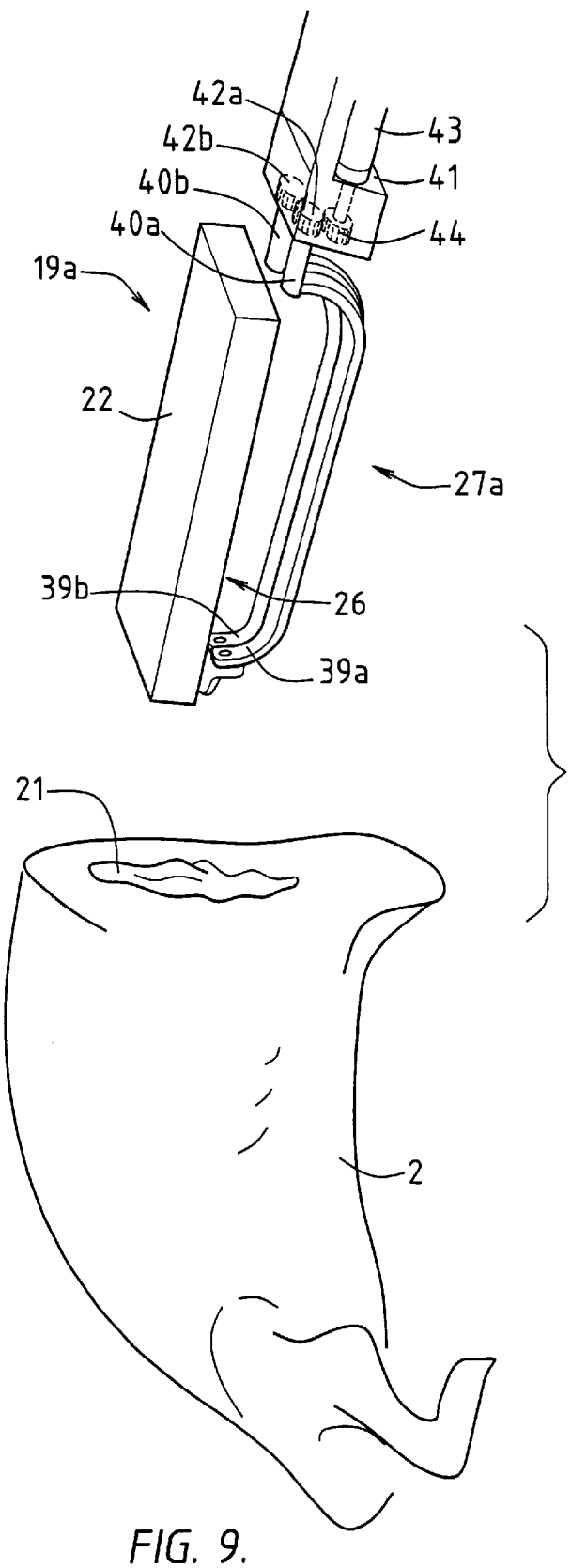
FIG. 9 diagrammatically depicts a perspective view of a first alternative embodiment of a scraper member when used in a device according to the invention.
Figure 10:
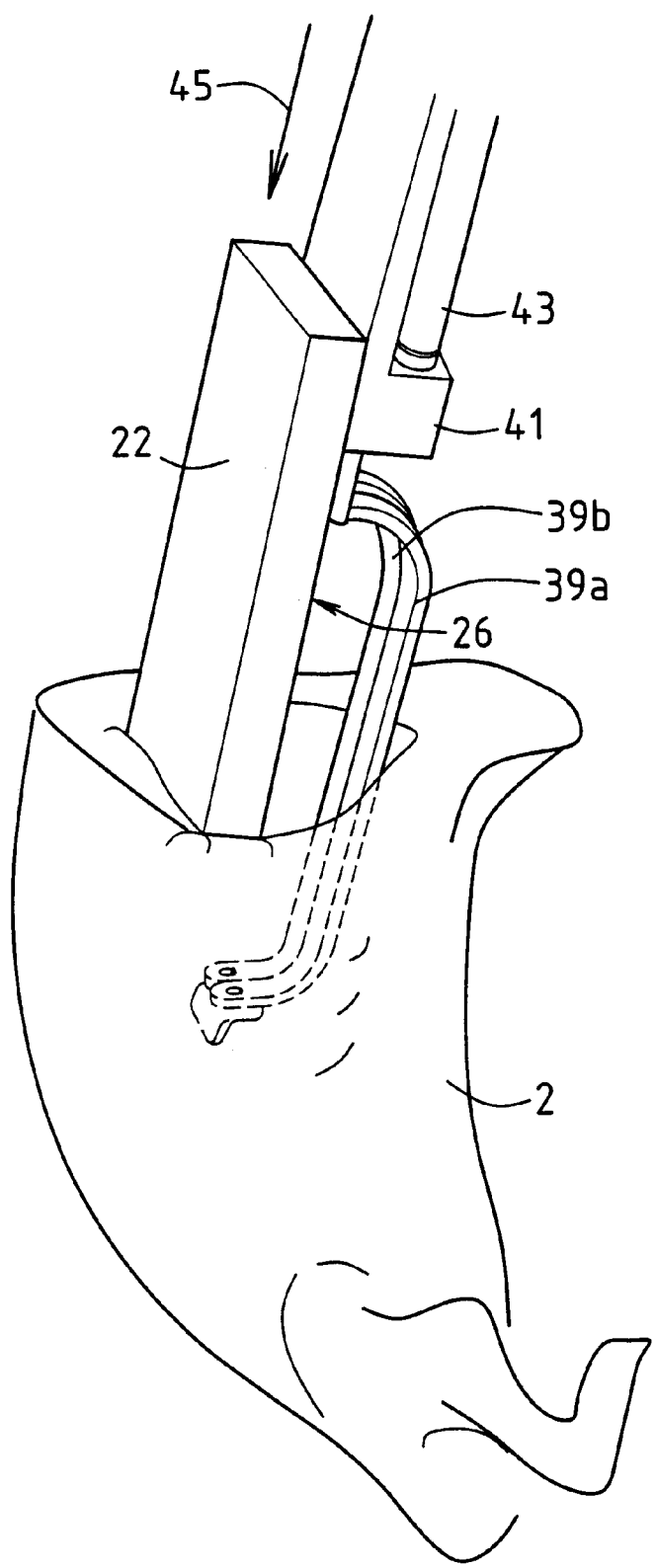
FIG. 10 diagrammatically depicts a perspective view of the arrangement shown in FIG. 9, in a second position thereof.
Figure 11:
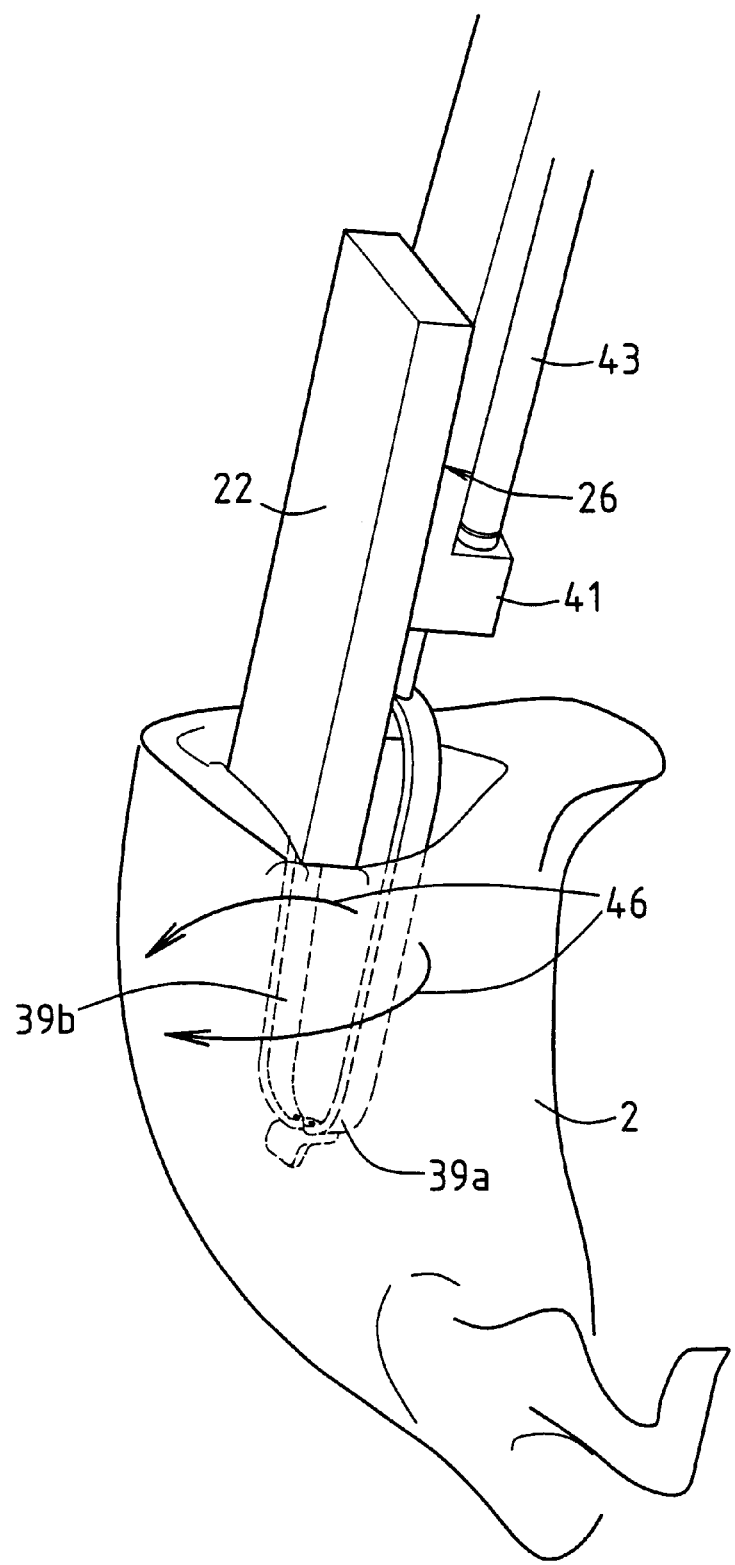
FIG. 11 diagrammatically depicts a perspective view of the arrangement shown in FIG. 9, in a third position thereof.

FIGS. 9, 10 and 11 show a part of a scraping device 19a according to the invention in which the scraper member 27 has been replaced by an alternative scraper member 27a.

The support 22 in the form of a flat plate is only diagrammatically indicated. Operating mechanisms with arms, follower rollers, cam tracks and the like have been omitted for the sake of clarity. The legs of the bird 2, which may still be present, as well as the way in which the bird is hung, are also not shown. Fixing means for the body of the bird 2 are also not shown.

The scraper member 27a is formed by two substantially U-shaped strips 39a, 39b which can pivot with respect to one another and are coupled via a (double) pivot at their front end. The strips 39a and 39b are attached to the ends of respective pins 40a, 40b which are mounted in a bearing block 41 and are each provided with a gearwheel 42a and 42b, respectively. The teeth of the gearwheels 42a and 42b engage in one another. The gearwheel 42a is driven via a gearwheel 44 arranged on a driveshaft 43. Consequently, the strips 39a and 39b pivot in opposite directions in the event of rotation of the driveshaft 43.

In a similar manner to that described above with reference to FIGS. 1–8, the scraping device 19a is arranged, in the direction indicated by arrow 45, at the evisceration opening 21 of the abdominal cavity of the bird 2, the strips 39a, 39b being pivoted towards one another into a so-called closed position, out of the position shown in FIG. 9 towards the position shown in FIG. 10.

FIG. 10 shows the scraper member 27a once it has been at least partially introduced into the abdominal cavity of the bird 2. The abdominal skin which is connected to abdominal fat is enclosed as a result of the two strips 39a, 39b being pivoted with respect to one another, in the direction of arrows 46, into a so-called open position, which is shown in FIG. 11. Here, the double pivot which couples the strips 39a, 39b to one another does not move with respect to the supporting surface 26 of the support 22.

Then, the scraper member 27a can be moved upwards along the support 22 for the purpose of scraping the abdominal fat off the abdominal skin. After the abdominal fat which has been scraped off has been removed from the scraper member 27a and the support 22, the strips 39a, 39b are returned to their closed position, and a subsequent bird can be processed.

The cross section of the bracket-like part of the scraper member 27 and the cross section of the strips 39a, 39b can be shaped in various ways. One possible embodiment is for angles to be rounded, with the exception of a relatively sharp angle which forms a scraping edge facing towards the support 22. The said angles may be right angles, but may also be acute of obtuse. The embodiment is selected in such a manner that under the operating conditions specified an optimum scraping action or discharge of abdominal fat from the scraping device is obtained.

Figure 12:
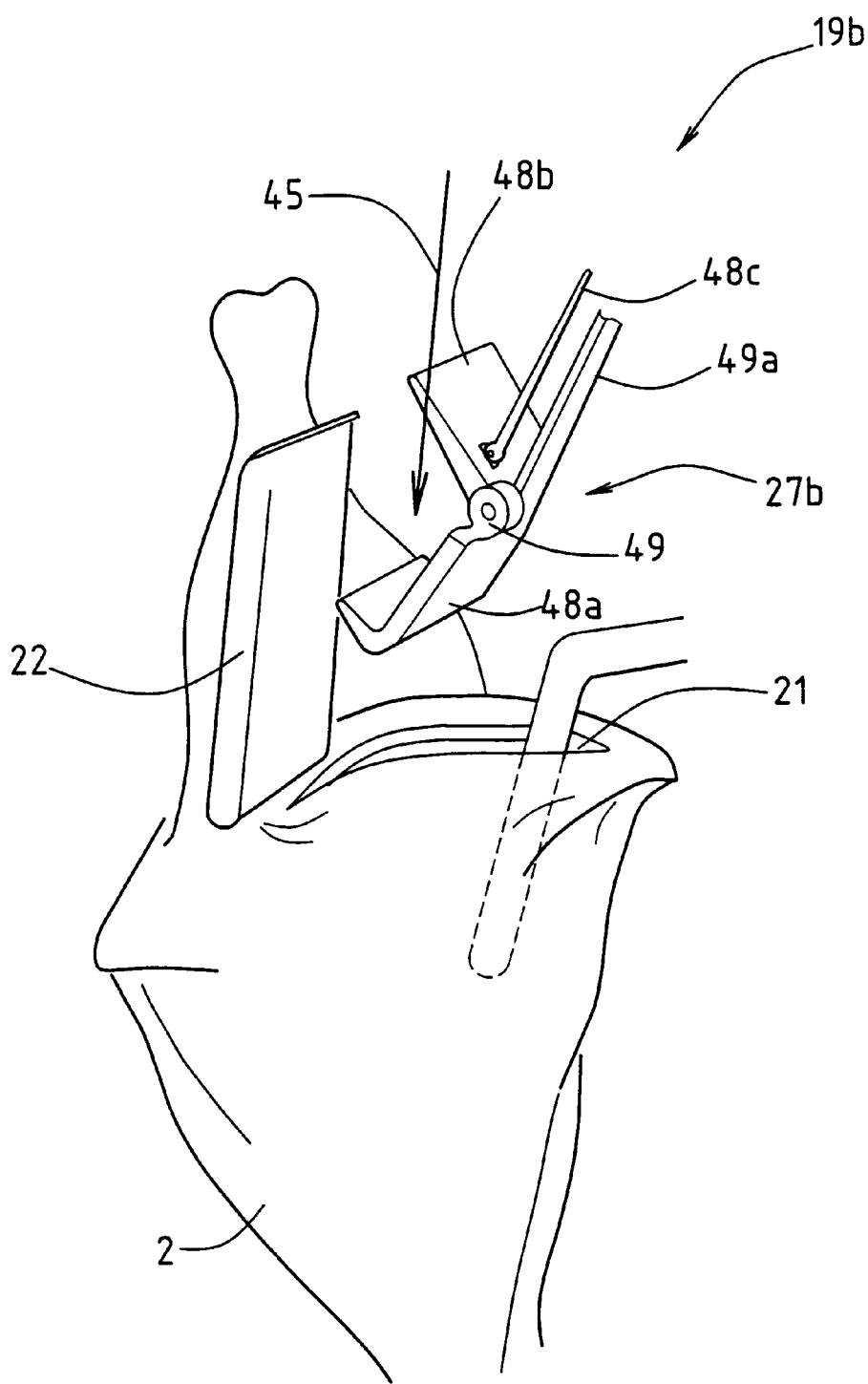
FIG. 12 diagrammatically depicts a perspective view of a second alternative embodiment of a scraper member when used in a device according to the invention.
Figure 13:
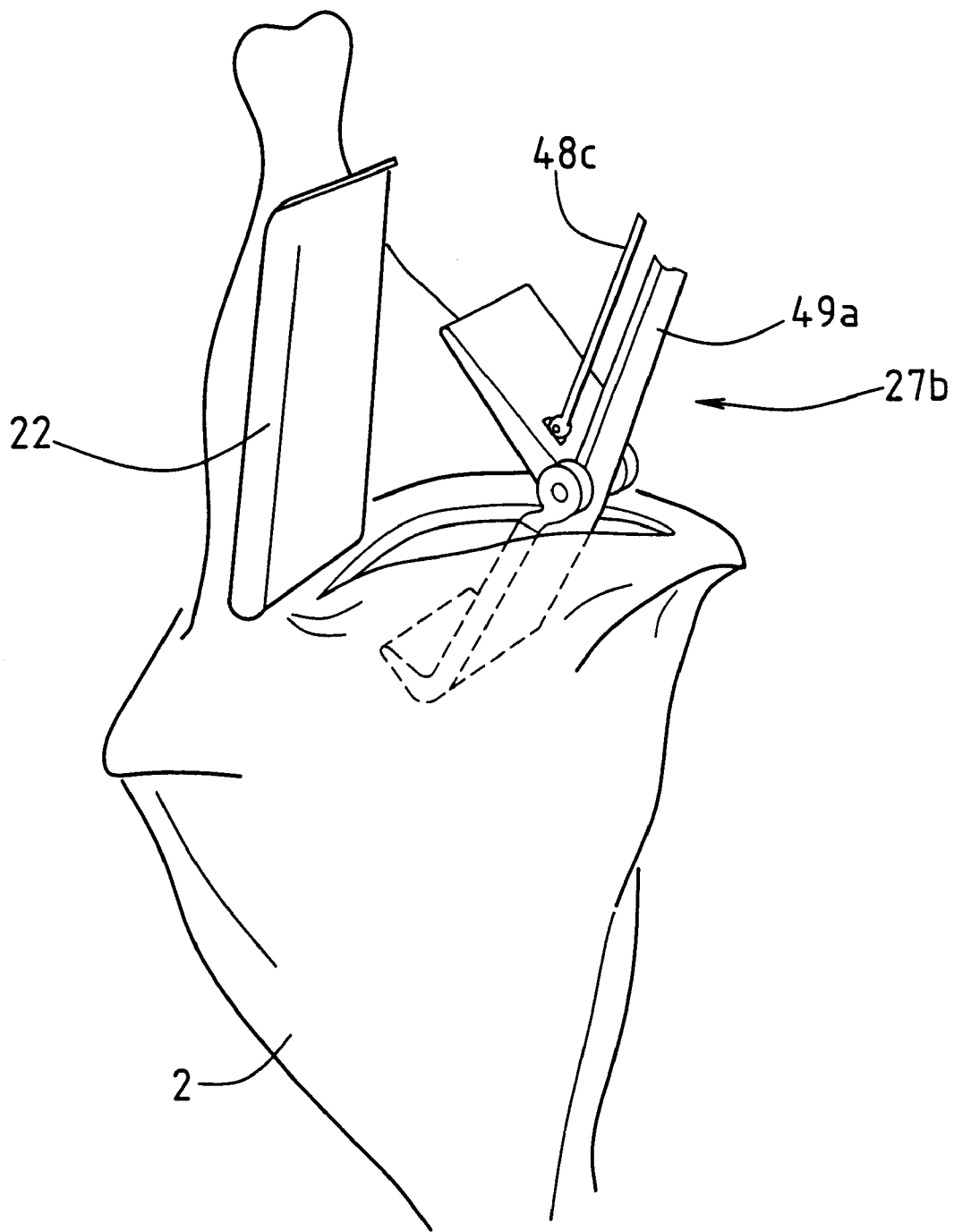
FIG. 13 diagrammatically depicts a perspective view of the arrangement shown in FIG. 12, in a second position thereof.
Figure 14:
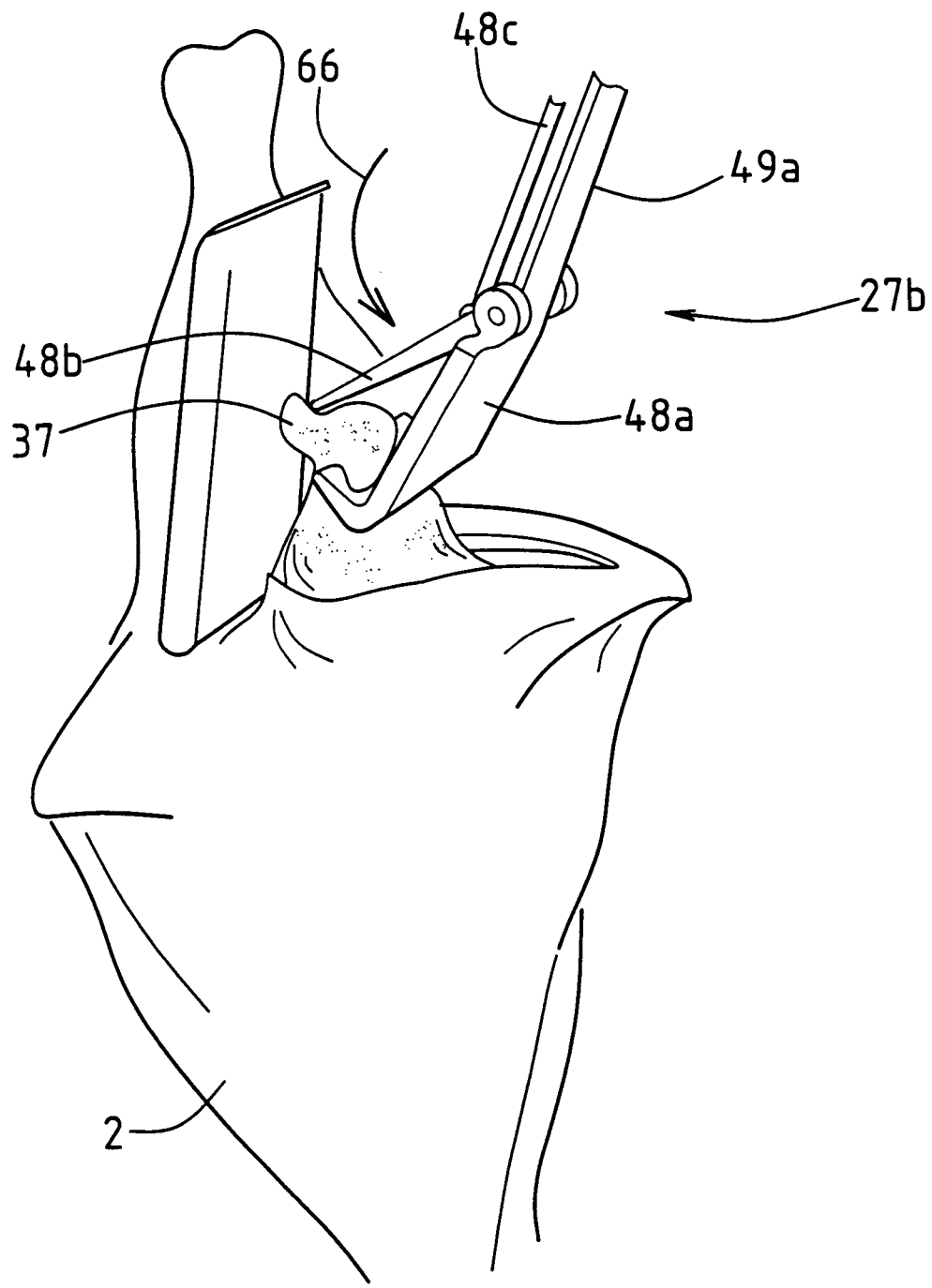
FIG. 14 diagrammatically depicts a perspective view of the arrangement shown in FIG. 12, in a third position thereof.

FIGS. 12–14 show a section of a scraping device 19b according to the invention, having a scraper member 27b. The support 22, in the form of a flat plate, is only diagrammatically indicated. Operating mechanisms comprising arms, follower rollers, cam tracks and the like have once again been omitted for the sake of clarity, as have one of the legs of the bird 2 and the way in which the bird is hung.

The scraper member 27b is formed by a plate part 48a, which is attached to an arm 49a and is L-shaped in cross section, and a gripper member 48b which is connected thereto via a pivot 49 and can be pivoted with the aid of an actuating rod 48c which is pivotably connected to the plate part 48a.

In a similar manner to that described above with reference to FIGS. 1–8, the scraping device 19a is arranged, in the direction indicated by arrow 45, at the evisceration opening 21 of the abdominal cavity of the bird 2, the scraper member 27b being in a so-called open position. Then, the scraper member 27b is moved out of the position shown in FIG. 12 into the position shown in FIG. 13.

FIG. 13 shows the scraper member 27b once it has been at least partially introduced into the abdominal cavity of the bird 2 via the evisceration opening 21. The scraper member 27b can then be displaced in a direction which is transverse with respect to the support 22, so that the abdominal fat bears against the active part of the plate part 48a, and the scraper member 27b can be moved upwards along the support 22 for the purpose of scraping the abdominal fat off the abdominal skin. This is shown in FIG. 14. While the abdominal fat 37 is being scraped off, the gripper member 48b is rotated, with the aid of the actuating rod 48c, in a direction indicated by arrow 66, so that the abdominal fat 37 is clamped securely in the scraper member 27b between the plate part 48a and the gripper member 48b, and the scraper member 27b is situated in its so-called closed position. In this way, the scraping action of the plate part 48a is assisted by a pulling action from the scraper member 27b in its closed position.

In an alternative embodiment, the gripper member 48b is absent, so that only the plate part 48a is active in the removal of the abdominal fat.

In another alternative embodiment, the free end of one or both plate parts 48a, 48b is provided with a cutting edge, so that abdominal fat which is situated between the plate parts 48a, 48b can also be cut off using the plate parts 48a, 48b.

In the description given above, the support 22 has been represented as a plate-like element with a flat supporting surface. However, the supporting surface may also be composed of a number of adjacent faces which are at an angle to one another or of one or more curved surfaces, such as a semi-cylindrical surface.

Figure 15:
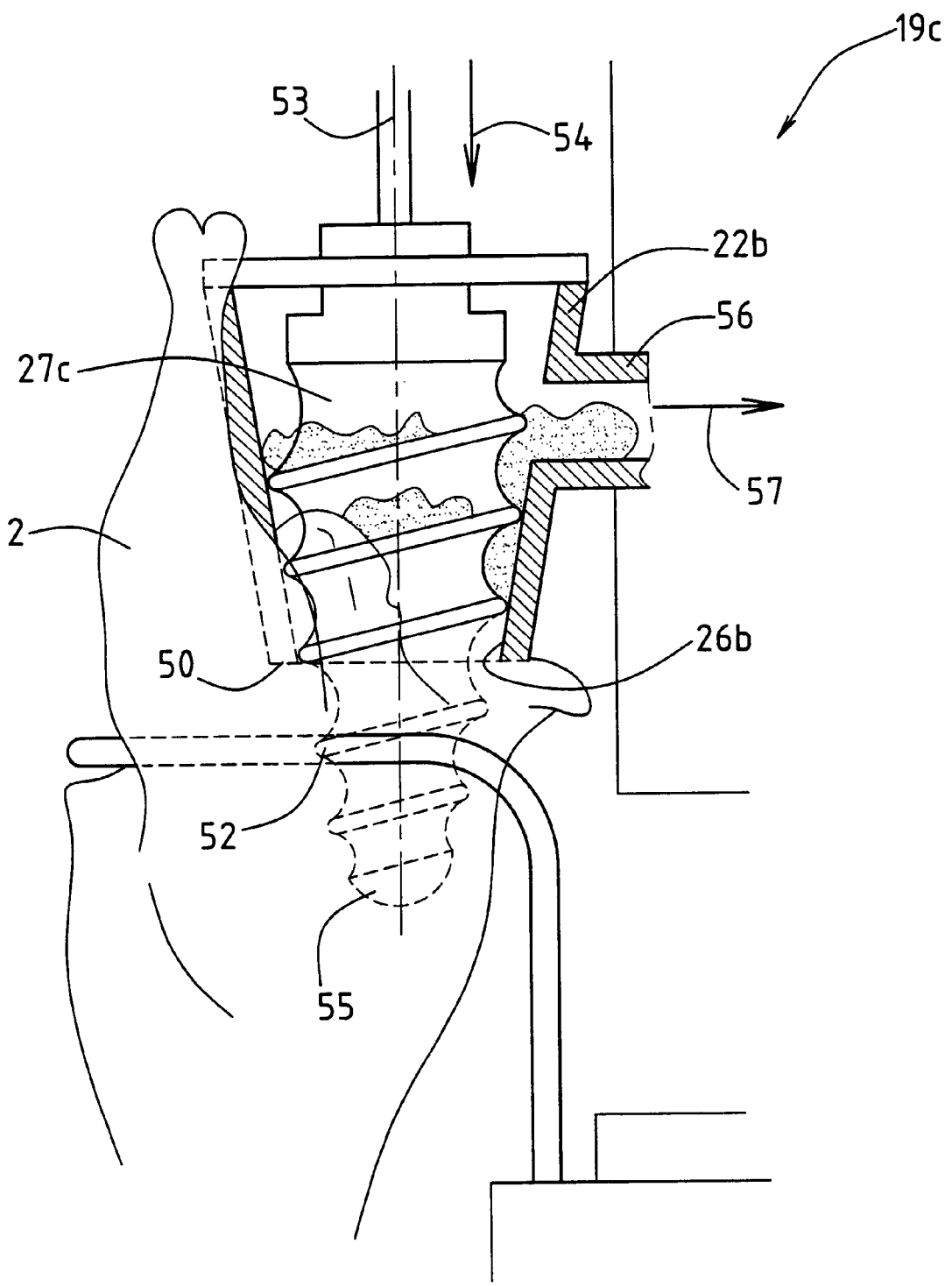
FIG. 15 diagrammatically depicts a cross section through a third alternative embodiment of a scraper member when used in a device according to the invention.
Figure 16:
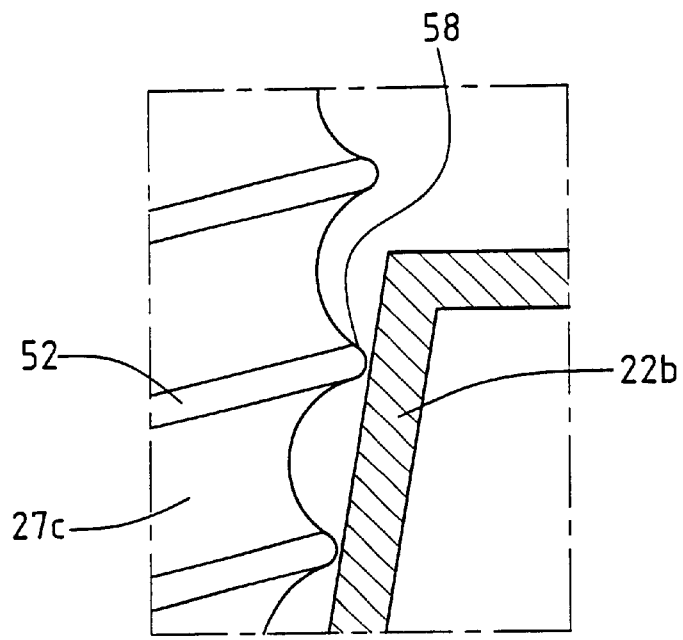
FIG. 16 diagrammatically depicts a cross section through a detail of the arrangement shown in FIG. 15.
Figure 17:
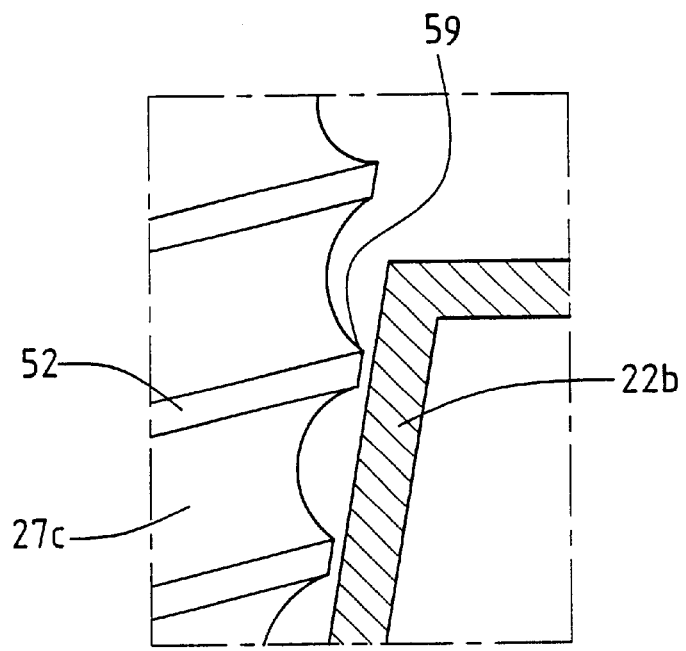
FIG. 17 diagrammatically depicts a cross section through a detail of an alternative embodiment of the arrangement shown in FIG. 15.

FIGS. 15–17 show a section of a scraping device 19c according to the invention, having a scraper member 27c and a support 22b with a supporting surface 26b. As in FIGS. 9, 10 and 11, operating mechanisms with arms, follower rollers, cam tracks and the like are not shown in more detail, for the sake of clarity of the illustration. The bird 2 is also only diagrammatically illustrated.

The support 22b is a substantially conical sleeve with a diameter which decreases towards its front end 50. The scraper member 27c is formed by a threaded spindle which is arranged in the interior of the sleeve 22b and is driven in rotation about its longitudinal axis via a driveshaft 53. The driveshaft 53 is connected to drive means (not shown in more detail). On its outer circumference, the scraper member 27c is provided with a helical scraping rib 52 and is at least partially surrounded by the conical support 22b, and has a suitably adapted transverse contour, so that there is only a very small amount of space between the scraper rib 52 and the supporting surface 26b. This is shown in more detail in FIG. 16.

The scraping device 19c is introduced, in a similar manner to that described above with reference to FIGS. 1–8, in the direction indicated by arrow 54, into the abdominal cavity of the slaughtered bird 2. In order for the scraper member 27c to be introduced into the abdominal cavity of the slaughtered bird 2 gently and without risk of damage to the tissue, the scraper member 27c has a spherical entry end 55. As a result of the threaded spindle being rotated, the abdominal fat will be removed from the abdominal cavity of the slaughtered bird 2 along the helical scraping rib 52 and will be removed from the sleeve via an outlet 56, in a direction indicated by arrow 57. The outlet 56 may, for example, be connected to suction means (not shown in more detail), such as a vacuum pump or other suitable suction means.

The scraping rib 52 has a relatively blunt contour 58. It is also possible for the scraping rib 52 to be provided with a sharp contour, so that a cutting edge 59 is formed, by means of which the abdominal fat to be removed can be cut off the abdominal skin to which it is connected. This is shown in more detail in FIG. 17.

Figure 18:
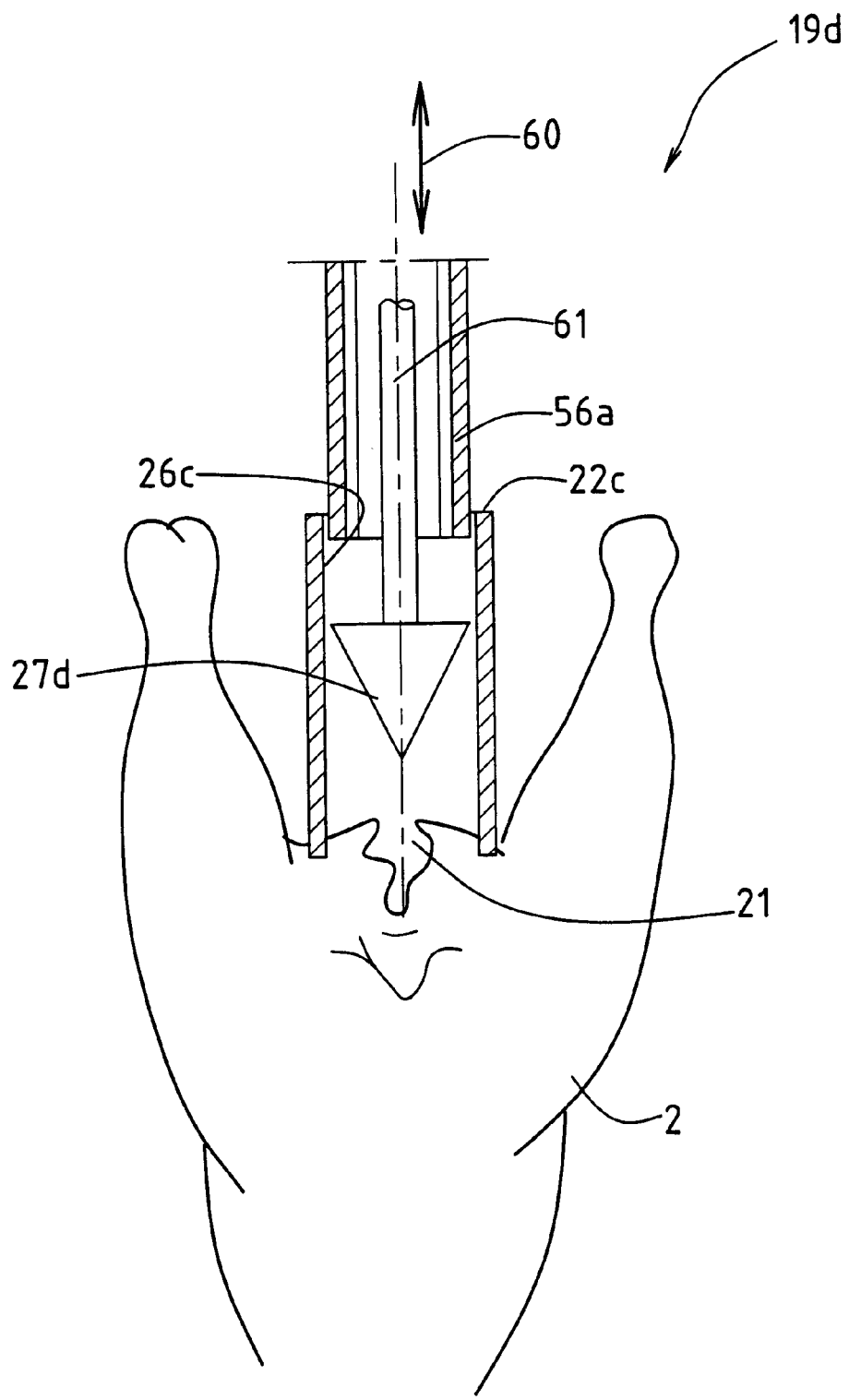
FIG. 18 diagrammatically depicts a cross section through a fourth alternative embodiment of a scraper member when used in a device according to the invention.
Figure 19:
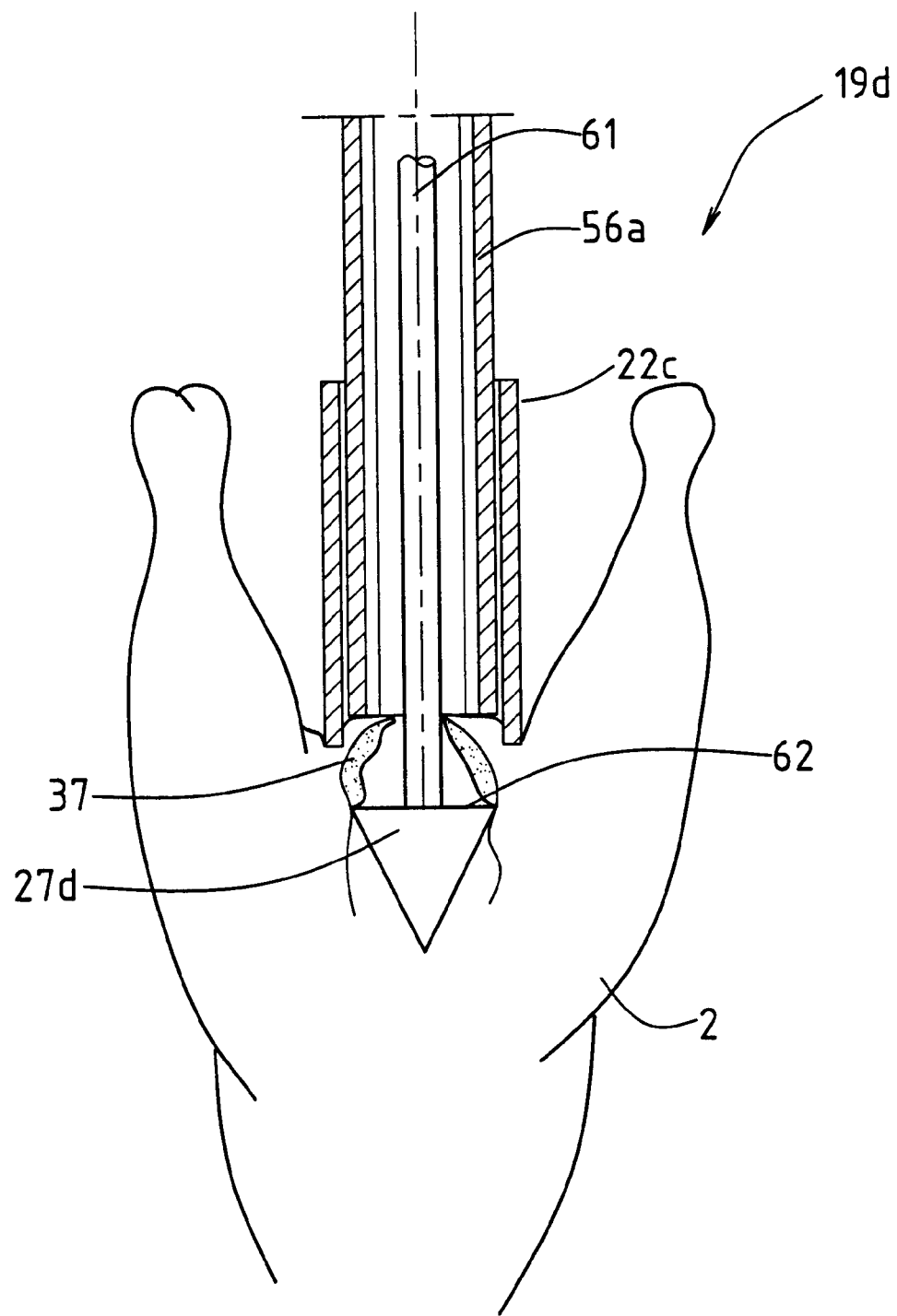
FIG. 19 diagrammatically depicts a cross section through the arrangement shown in FIG. 18, in a second position thereof.
Figure 20:
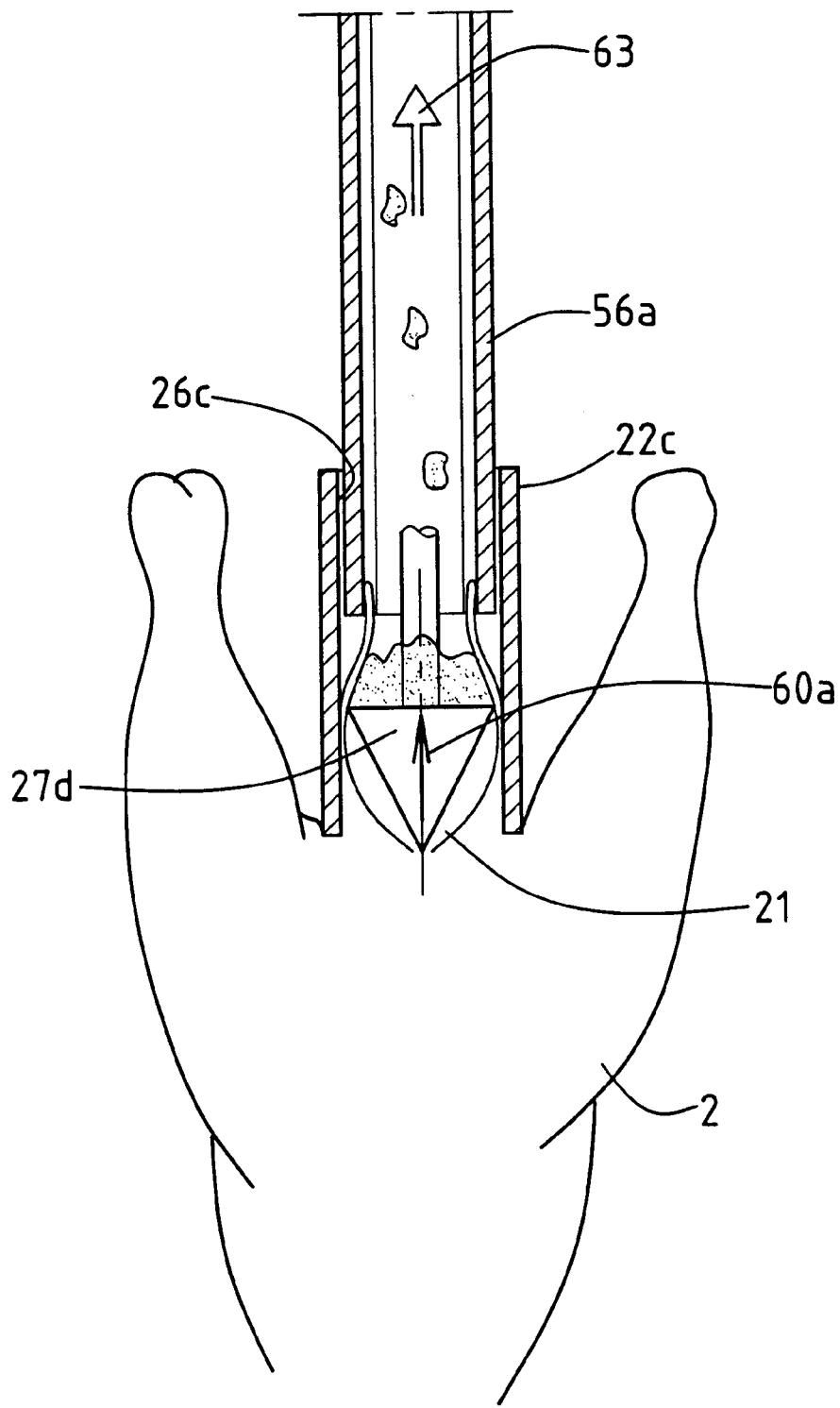
FIG. 20 diagrammatically depicts a cross section through the arrangement shown in FIG. 18, in a third position thereof.

FIGS. 18–20 show a section of a scraping device 19b according to the invention, having a scraper member 27d and a support 22c with a supporting surface 26c. The operating mechanisms with arms, follower rollers, cam tracks and the like are not shown in more detail, for the sake of simplicity of the illustration. The bird 2 is also only very diagrammatically illustrated, and the product carriers in which the slaughtered bird 2 is hanging are not shown in more detail.

The support 22c is formed by a hollow cylinder with an oval transverse contour, but this may also be any other suitable transverse contour, for example a round one.

The scraper member 27d is formed by a cone with a transverse contour which is adapted to the transverse contour of the support 22c. The scraper member 27d can be moved inside the support 22c, in an axial direction thereof, as indicated by a double arrow 60, by means of displacement means, which are not shown in more detail and are coupled to the scraper member 27d via a rod 61.

The scraping device 19d, in particular the support 22c with the supporting surface 26c, is arranged, in a similar manner to that described above with reference to FIGS. 1–8, in the vicinity of the evisceration opening 21 of the abdominal cavity of the slaughtered bird 2 and is then moved out of this position, which is shown in FIG. 18, into the position shown in FIG. 19.

FIG. 19 shows the scraper member 27d once it has been introduced into the abdominal cavity of the slaughtered bird 2, the abdominal cavity being only very diagrammatically indicated. The abdominal skin connected to abdominal fat 37 is situated on the underside 62 of the scraper member 27d. From the position shown in FIG. 19, the scraping device 19d, in particular the scraper member 27d, is moved to a position shown in FIG. 20.

FIG. 20 shows the scraper member 27d just outside the evisceration opening 21 of the slaughtered bird 2, the scraper member 27d having moved in the direction of arrow 60a with respect to the position shown in FIG. 19. As a result of the movement of the scraper member 27d in the direction indicated, this member moves along the scraping surface 26c, or at least a part thereof, and during the scraping movement brings with it the abdominal skin connected to abdominal fat 37, in the direction of the arrow 60, and the abdominal fat 37 is scraped off the abdominal skin.

Then, the abdominal fat 37 which has been scraped off can be detached from the scraper member 27d by removing it, via an outlet channel 56a, in a similar manner to that described with reference to FIG. 15 and as indicated by arrow 63.

To facilitate the introduction of the scraper member 27d into the abdominal cavity and to prevent damage to tissue, it is advantageous for the scraper member 27d to be as small as possible. However, to achieve a successful scraping action, it is necessary for the scraper member 27d to tightly adjoin the abdominal skin connected to abdominal fat in the abdominal cavity of the bird 2. This can be achieved by designing the scraper member 27d in such a way that the transverse dimensions of the scraper member 27d are adjustable. This is shown in FIG. 21.

Figure 21:
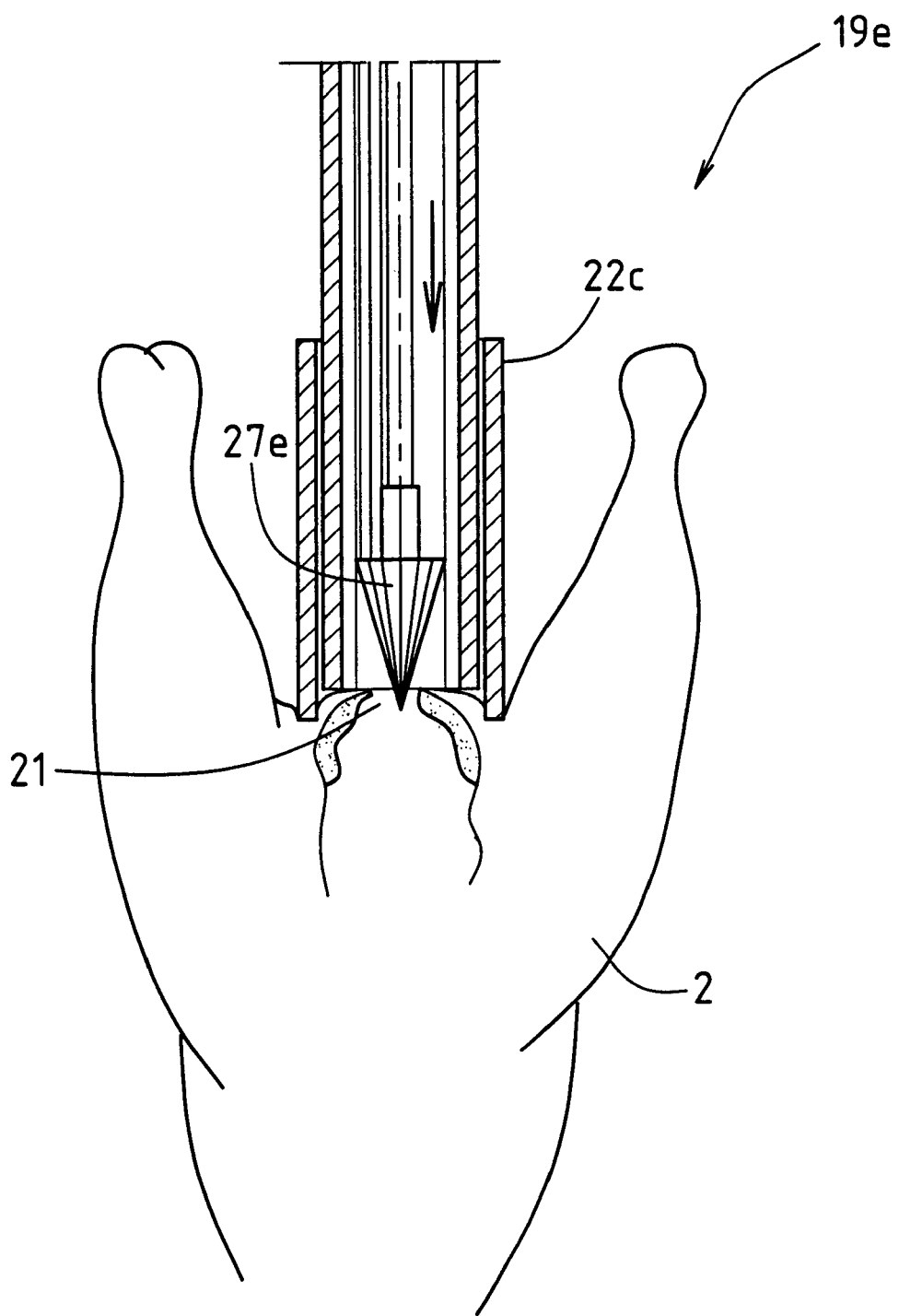
FIG. 21 diagrammatically depicts a cross section through an alternative embodiment of the scraper member shown in FIG. 18.
Figure 22:
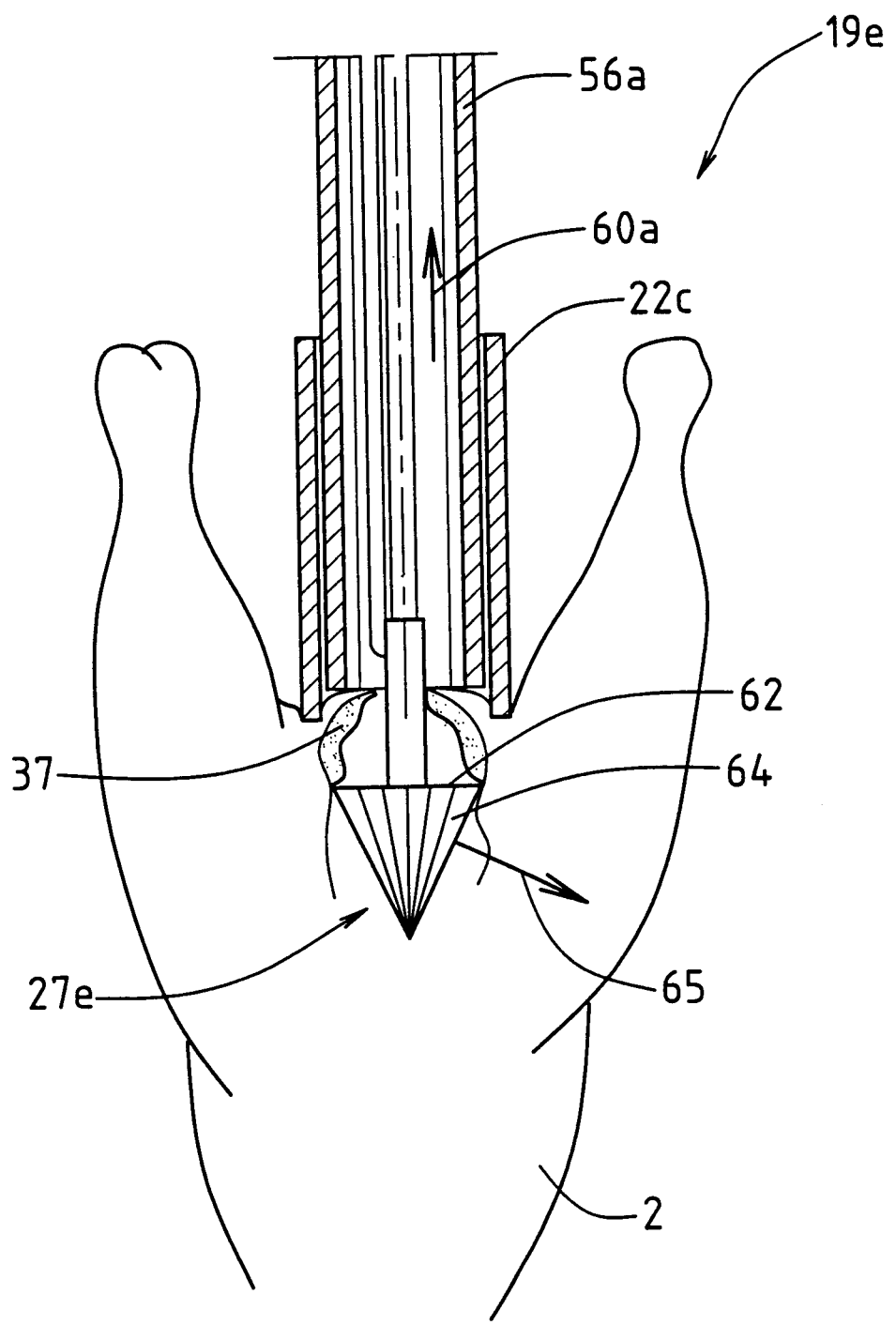
FIG. 22 diagrammatically depicts a cross section through the arrangement shown in FIG. 21, in a second position thereof.

FIGS. 21 and 22 show a part of a scraping device 19e having a scraper member 27e which, in the starting position shown in FIG. 21, is situated just outside the evisceration opening 21 of the bird 2. With a view to simplicity of the illustration, the operating mechanisms are not shown.

The scraper member 27e has a conical surface and adjustable transverse dimensions. This can be achieved by forming the surface of the scraper member 27e from substantially plate-like segments 64 which can be partially slid over one another. From the starting position of the scraper member 27e shown in FIG. 21, the scraper member 27e is moved, in the manner described above, into the abdominal cavity of the bird 2, towards the position shown in FIG. 22, in which the underside 62 of the scraper member 27e has been moved to just beyond the abdominal fat 37. Once they have been introduced into the abdominal cavity of the bird 2, the segments 64 of the scraper member 27e are pivoted radially outwards in the manner of an umbrella, as indicated by arrow 65, by means of displacement means (not shown in more detail), so that the transverse dimensions of the scraper member 27e are increased and the abdominal fat 37 bears against the underside 62 of the scraper member 27e. The abdominal fat 37 can then be removed from the abdominal cavity of the bird 2 as a result of the scraper member 27e being moved in the direction of arrow 60a.

If the supporting surface is designed not to move with respect to the abdominal skin during the operation of scraping off the abdominal fat, measures can be taken in order to optimize the contact between the abdominal skin and the supporting surface. To this end, the supporting surface may be provided with a relief pattern, but the supporting member may also, for example, be of hollow design and connected to a reduced-pressure source, perforations in the supporting surface ensuring that the abdominal skin is sucked onto the supporting surface.

In the above, the removal of abdominal fat has been illustrated with reference to scraping operations in which the generation of shear forces in the abdominal fat brings about separation between the abdominal fat and the rest of the abdominal fat or the abdominal skin.

Scraping operations of this type also encompass milling operations, in which a milling means moves along a supporting surface for the purpose of removing abdominal fat which is situated in the path of the milling means.

While the invention has been described and illustrated in its preferred embodiments, it should be understood that departures may be made therefrom within the scope of the invention, which is not limited to the details disclosed herein.

What is claimed is:

1. A method for separating abdominal fat from abdominal skin of a slaughtered bird, comprising:
    positioning a supporting surface, having a longitudinal axis, substantially on the exterior of the abdominal skin of the bird; and
    scraping abdominal fat off the interior of the abdominal skin of the bird using a moveable scraper member,
    wherein the scraper member is moved in a direction substantially parallel to the longitudinal axis of the supporting surface during scraping.

2. The method of claim 1, wherein the supporting surface is in a substantially fixed position relative to the abdominal skin during scraping.

3. The method of claim 2, wherein the fixed position is adjustable.

4. The method of claim 1, wherein the supporting surface moves with respect to the abdominal skin in substantially the same direction as the scraper member during scraping.

5. The method of claim 1, wherein positioning a support surface comprises moving the supporting surface to an edge of the abdominal cavity of the bird prior to scraping.

6. The method of claim 1, further comprising moving the scraper member at least partially into the abdominal cavity of the bird prior to scraping.

7. The method of claim 6, wherein the scraper member comprises a moveable part that, when introduced into the abdominal cavity of the bird, is positioned, as seen in a direction perpendicular to the longitudinal axis of the supporting surface, at a first distance from the supporting surface, and that, during at least part of the scraping operation, is positioned at a second distance from the supporting surface, wherein the second distance is smaller than the first distance.

8. The method of claim 1, wherein the scraper member moves a length along a portion of the supporting surface during scraping and wherein the length is adjustable.

9. The method of claim 1, wherein abdominal fat is positioned between the supporting surface and the scraper member and is gripped by a gripper member during scraping.

10. The method of claim 1, wherein abdominal fat is completely or partially freed from abdominal skin during scraping.

11. The method of claim 1, further comprising removing abdominal fat adhering to the scraper member using a discharge member.

12. The method of claim 1, further comprising removing abdominal fat adhering to the scraper member using suction means.

13. The method of claim 1, wherein the supporting surface comprises at least one substantially flat face.

14. The method of claim 1, wherein the supporting surface comprises at least one plate.

15. The method of claim 1, wherein the supporting surface comprises a hollow cylinder.

16. The method of claim 15, wherein the diameter of the hollow cylinder decreases towards at least one end of the cylinder.

17. The method of claim 1, wherein positioning a supporting surface comprises moving the supporting surface near an edge of an evisceration opening of the bird prior to the scraping.

18. The method of claim 17, wherein the supporting surface is positioned on the side of the sternum of the bird.

19. The method of claim 1, wherein the abdomen of the bird faces substantially upwards during scraping.

20. The method of claim 1, further comprising selectively removing abdominal fat from the bird.

21. The method of claim 1, further comprising positioning abdominal fat between the supporting surface and the scraper member prior to scraping.

22. A device for separating abdominal fat from abdominal skin of a slaughtered bird, comprising:
    a supporting surface, having a longitudinal axis, for positioning substantially on the exterior of the abdominal skin of the bird;
    a scraper member for scraping abdominal fat off the interior of the abdominal skin of the bird; and
    first displacement means for displacing the scraper member in a direction substantially parallel to the longitudinal axis of the supporting surface.

23. The device of claim 22, wherein the supporting surface comprises at least one substantially flat face.

24. The device of claim 22, wherein the supporting surface comprises at least one plate.

25. The device of claim 22, wherein the scraper member comprises a bracket.

26. The device of claim 25, wherein a transverse dimension of the bracket decreases towards at least one end of the bracket.

27. The device of claim 25, wherein the bracket comprises at least two bracket parts which are movable relative to each other.

28. The device of claim 27, wherein the at least two bracket parts are pivotable relative to each other.

29. The device of claim 22, wherein the scraper member comprises a pivotable gripper member.

30. The device of claim 22, wherein the supporting surface comprises a hollow cylinder.

31. The device of claim 30, wherein the diameter of the hollow cylinder decreases towards at least one end of the cylinder.

32. The device of claim 30, wherein the scraper member comprises a substantially pointed cone.

33. The device of claim 32, wherein the transverse dimensions of the scraper member are adjustable.

34. The device of claim 31, wherein the scraper member comprises a tapered body having at least one scraper rib and wherein at least a portion of the scraper member rotates.

35. The device of claim 34, wherein the at least one scraper rib comprises a cutting edge.

36. The device of claim 22, comprising second displacement means for displacing a scraping part of the scraper member in a direction substantially perpendicular to the longitudinal axis of the supporting surface.

37. The device of claim 36, wherein the second displacement means comprises spring means.

38. The device of claim 36, wherein the second displacement means displaces the scraping part to vary the distance between the scraping part and the supporting surface.

39. The device of claim 22, further comprising a positioning member for engaging an abdominal opening in the bird.

40. The device of claim 39, wherein the positioning member is adapted for engaging the abdominal opening towards the back side of the bird.

41. The device of claim 22, further comprising a discharge member for discharging abdominal fat from the scraper member.

42. The device of claim 22, further comprising suction means for removing abdominal fat from the scraper member.

43. The device of claim 22, further comprising means for adjusting the position of the supporting surface for varying removal of abdominal fat from the bird.

44. The device of claim 22, comprising means for positioning abdominal skin between the supporting surface and the scraper member under atmospheric conditions.

45. The device of claim 22, further comprising means for adjusting the movement of the scraper member for varying removal of abdominal fat from the bird.

* * * * *